(12) United States Patent
Ma et al.

(10) Patent No.: US 9,377,090 B2
(45) Date of Patent: Jun. 28, 2016

(54) COMPACT TENSIONER WITH SUSTAINABLE DAMPING

(75) Inventors: Wei Ma, Richmond Hill, CA (US); Gerald J. Hamers, Woodbridge (CA)

(73) Assignee: Litens Automotive Partnership, Woodbridge (CA)

( * ) Notice: Subject to any disclaimer, the term of this patent is extended or adjusted under 35 U.S.C. 154(b) by 982 days.

(21) Appl. No.: 13/145,081

(22) PCT Filed: Sep. 30, 2009

(86) PCT No.: PCT/CA2009/001394
§ 371 (c)(1),
(2), (4) Date: Jul. 18, 2011

(87) PCT Pub. No.: WO2010/037232
PCT Pub. Date: Apr. 8, 2010

(65) Prior Publication Data
US 2012/0004059 A1    Jan. 5, 2012

Related U.S. Application Data

(60) Provisional application No. 61/102,112, filed on Oct. 2, 2008.

(51) Int. Cl.
*F16H 7/12* (2006.01)
*F16H 7/08* (2006.01)

(52) U.S. Cl.
CPC ........ *F16H 7/1218* (2013.01); *F16H 2007/081* (2013.01); *F16H 2007/0893* (2013.01)

(58) Field of Classification Search
CPC ............ F16H 7/1218; F16H 2007/081; F16H 2007/0893
USPC .................. 474/101, 113, 117, 133, 134, 135
See application file for complete search history.

(56) References Cited

U.S. PATENT DOCUMENTS

| 4,473,362 A | 9/1984 | Thomey et al. |
| 4,583,962 A | 4/1986 | Bytzek et al. |

(Continued)

FOREIGN PATENT DOCUMENTS

| CA | 2492025 C | 1/2004 |
| CN | 1495375 A | 5/2004 |

(Continued)

OTHER PUBLICATIONS

Wacker Ceramics Brochure (Functional Coatings), Feb. 4, 2001, Wacker Ceramics (Wacker-Chemie GmbH).

(Continued)

*Primary Examiner* — Michael Mansen
*Assistant Examiner* — Juan Campos, Jr.
(74) *Attorney, Agent, or Firm* — Harness, Dickey & Pierce, P.L.C.

(57) ABSTRACT

A tensioner assembly that includes a base, an arm, an opening spring (i.e., a torsion spring that opens or radially expands with increasing torque applied thereto), a spring reaction member, and a pivot bushing. The tensioner assembly is configured to orient various loads in predetermined directions. For example, a spring load can be oriented to counteract a hub load to reduce a bushing load that acts on the pivot bushing. As another example, a spring reaction force exerted by the spring reaction member can be employed by a damping mechanism to generate a grounding force that is parallel to the spring reaction force and is directed to intersect an axis about which the arm pivots relative to the base. A tensioner assembly having improved assembly characteristics is also provided.

36 Claims, 22 Drawing Sheets

(56) References Cited

U.S. PATENT DOCUMENTS

| | | | |
|---|---|---|---|
| 4,689,037 A | 8/1987 | Bytzek | |
| 4,698,049 A | 10/1987 | Bytzek et al. | |
| 4,826,471 A | 5/1989 | Ushio | |
| 4,886,484 A | 12/1989 | Hanes | |
| 4,938,734 A | 7/1990 | Green et al. | |
| 4,983,145 A | 1/1991 | Hirai et al. | |
| 5,011,460 A | 4/1991 | Ouchi et al. | |
| 5,030,171 A | 7/1991 | Henderson | |
| 5,083,983 A | 1/1992 | Hirai et al. | |
| 5,195,932 A | 3/1993 | Hirai et al. | |
| RE34,543 E | 2/1994 | Komorowski | |
| 5,312,302 A | 5/1994 | Yamamoto | |
| 5,352,160 A | 10/1994 | Sakai et al. | |
| 5,407,397 A | 4/1995 | Foley | |
| 5,478,285 A | 12/1995 | Bakker et al. | |
| 5,632,697 A | 5/1997 | Serkh | |
| 5,647,813 A | 7/1997 | Serkh | |
| 5,795,257 A | 8/1998 | Giese et al. | |
| 5,803,849 A | 9/1998 | Ayukawa | |
| 5,967,919 A | 10/1999 | Bakker | |
| 5,975,257 A | 11/1999 | Roach | |
| 6,004,235 A | 12/1999 | Ohta et al. | |
| 6,059,679 A | 5/2000 | Tsutsui et al. | |
| 6,264,578 B1 | 7/2001 | Ayukawa | |
| 6,422,963 B2 | 7/2002 | Kurose | |
| 6,497,632 B2 | 12/2002 | Ayukawa et al. | |
| 6,565,468 B2 | 5/2003 | Serkh | |
| 6,575,860 B2 | 6/2003 | Dutil | |
| 6,582,332 B2 | 6/2003 | Serkh | |
| 6,609,988 B1 | 8/2003 | Liu et al. | |
| 7,004,863 B2 | 2/2006 | Serkh et al. | |
| 7,144,344 B2 | 12/2006 | Konanz | |
| 7,186,196 B2 | 3/2007 | Quintus | |
| 7,588,507 B2 | 9/2009 | Ayukawa et al. | |
| 2002/0010045 A1 | 1/2002 | Serkh | |
| 2002/0177499 A1 | 11/2002 | Ayukawa et al. | |
| 2003/0119616 A1 | 6/2003 | Meckstroth et al. | |
| 2003/0216204 A1 | 11/2003 | Serkh et al. | |
| 2004/0014542 A1 | 1/2004 | Quintus | |
| 2004/0235598 A1 | 11/2004 | Kawasaki et al. | |
| 2005/0096168 A1 | 5/2005 | Serkh et al. | |
| 2006/0079360 A1 | 4/2006 | Jung et al. | |
| 2006/0172837 A1 | 8/2006 | Quintus | |
| 2007/0010361 A1 | 1/2007 | Kobelev et al. | |
| 2008/0035779 A1 | 2/2008 | Guhr et al. | |
| 2008/0194366 A1 | 8/2008 | Mevissen et al. | |
| 2008/0274846 A1 | 11/2008 | Ayukawa et al. | |
| 2009/0054186 A1 | 2/2009 | Stegelmann et al. | |
| 2009/0075768 A1 | 3/2009 | D'Silva et al. | |
| 2009/0131208 A1 | 5/2009 | Hawryluck et al. | |
| 2009/0163312 A1 | 6/2009 | Stegelmann et al. | |
| 2009/0181815 A1* | 7/2009 | Guhr | 474/135 |
| 2009/0239696 A1 | 9/2009 | D'Silva et al. | |

FOREIGN PATENT DOCUMENTS

| | | |
|---|---|---|
| CN | 1516789 A | 7/2004 |
| CN | 1575386 A | 2/2005 |
| CN | 1668863 A | 9/2005 |
| CN | 1894521 A | 1/2007 |
| DE | 4010928 A1 | 10/1991 |
| DE | 102004047422 A1 | 4/2006 |
| DE | 102006017287 A1 | 10/2007 |
| DE | 102008014325 A1 | 9/2009 |
| EP | 364277 B1 | 4/1990 |
| EP | 425246 A1 | 5/1991 |
| EP | 0450620 A1 | 10/1991 |
| EP | 536809 A1 | 4/1993 |
| EP | 546825 A2 | 6/1993 |
| EP | 361889 B1 | 10/1993 |
| EP | 575662 A1 | 12/1993 |
| EP | 0780597 A1 | 6/1997 |
| EP | 0907040 A1 | 4/1999 |
| EP | 780597 B1 | 3/2001 |
| EP | 907040 B1 | 3/2002 |
| EP | 1398539 B1 | 3/2004 |
| EP | 1640636 A2 | 3/2006 |
| EP | 2005029 A1 | 12/2008 |
| GB | 2328728 A | 3/1999 |
| JP | 05030595 U | 4/1993 |
| JP | 07151198 A | 6/1995 |
| JP | 11-013843 A | 1/1999 |
| JP | 2000239297 A | 9/2000 |
| JP | 2002-174306 A | 6/2002 |
| JP | 2003-042246 A | 2/2003 |
| JP | 2003254399 A | 9/2003 |
| JP | 2003278864 A | 10/2003 |
| JP | 2003322228 A | 11/2003 |
| JP | 2003336702 A | 11/2003 |
| JP | 2003120768 A | 4/2004 |
| JP | 2004270824 A | 9/2004 |
| JP | 2005076672 A | 3/2005 |
| JP | 2005147304 A | 6/2005 |
| JP | 2005-299810 A | 10/2005 |
| JP | 2006029536 A | 2/2006 |
| JP | 2006029537 A | 2/2006 |
| JP | 2006-070936 A | 3/2006 |
| JP | 2006170435 A | 6/2006 |
| JP | 2008032037 A | 2/2008 |
| WO | WO-0146603 A1 | 6/2001 |
| WO | 0229279 A3 | 4/2002 |
| WO | 03098071 A1 | 11/2003 |
| WO | 2004033933 A1 | 4/2004 |
| WO | 2005064201 A1 | 7/2005 |
| WO | 2007106971 A1 | 9/2007 |
| WO | 2007113039 A1 | 10/2007 |
| WO | 2007118625 | 10/2007 |
| WO | WO-2007118625 A1 | 10/2007 |
| WO | 2008028782 A1 | 3/2008 |
| WO | 2008106971 A1 | 9/2008 |

OTHER PUBLICATIONS

Ekagrip Frictional Coating—Version 1.10 (specification sheet), Jun. 23, 2003, Wacker Ceramics (Wacker-Chemie GmbH).

Ekagrip Frictional Foil—Version 1.10 (specification sheet), Jun. 23, 2003, Wacker Ceramics (Wacker-Chemie GmbH).

Mubea drawing "Damping Clamp", Drawing No. 0403550052, Jan. 19, 2005, Mubea.

Mubea drawing "Damping Lining", Drawing No. 0403550062, Jan. 20, 2005, Mubea.

Mubea drawing "Collar Bushing", Drawing No. 0403550132, Feb. 2, 2005, Mubea.

Mubea drawing "Tension Pulley", Drawing No. 0403550123, Feb. 5, 2005, Mubea.

Mubea drawing "LU Belt Tensioner 350N (Mubea E4 Plus)", Drawing No. 4718214, May 21, 2005, Mubea.

Mubea drawing "Pulley Carrier", Drawing No. 040350212, Jun. 30, 2005, Mubea.

Mubea drawing "Mounting Flange", Drawing No. 0403550222, Jun. 30, 2005, Mubea.

Test-part order of BMW Motoren GmbH 4718214.9 LU Belt tensioner 350N (Mubea E4 Plus), Dec. 22, 2005, BMW.

Data Sheet 600018 of Mubea Motorkomponenten GmbH, Jan. 4, 2006, Mubea.

Mubea drawing "Bearing Bolt", Drawing No. 0403550393, Jan. 16, 2006, Mubea.

Delivery Note 4/010 428106 of Mubea Motorkomponenten GmbH, Jan. 23, 2006, Mubea.

Invoice 41010 1900061 of Mubea Motorkomponenten GmbH, Jan. 23, 2006, Mubea.

Mubea drawing "Torsion spring 450 N", Drawing No. 0403550343, Jan. 31, 2006, Mubea.

Delivery Note 4/010 428157 of Mubea Motorkomponenten GmbH, Feb. 13, 2006, Mubea.

Invoice 4/010 1900123 of Mubea Motorkomponenten GmbH, Feb. 13, 2006, Mubea.

Delivery Note 4/010 428184 of Mubea Motorkomponenten GmbH, Feb. 24, 2004, Mubea.

(56) References Cited

OTHER PUBLICATIONS

Invoice 4/010 1900151 of Mubea Motorkomponenten GmbH, Feb. 24, 2006, Mubea.
Delivery Note 4/010 428195 of Mubea Motorkomponenten GmbH, Mar. 3, 2006, Mubea.
Invoice 4/010 1900164 of Mubea Motorkomponenten GmbH, Mar. 3, 2006, Mubea.
Delivery Note 4/010 428219 of Mubea Motorkomponenten GmbH, Mar. 14, 2006, Mubea.
Invoice 4/010 1900184 of Mubea Motorkomponenten GmbH, Mar. 14, 2006, Mubea.
Mubea folder 8/6 for belt tensioner "BMW N47 Tensioner", Mar. 14, 2006, Mubea.
Written Opinion for PCT/CA2009/001394, Jan. 21, 2010, ISA.
Search Report for PCT/CA2009/001394, Jan. 21, 2010, ISA.
Supplementary Search Report for EP09817152, Mar. 19, 2012, EPO.
First Office Action for CN2009801941, Feb. 27, 2013, SIPO.
English Translation of First Office Action for CN2009801941, Feb. 27, 2013, SIPO.
Office Action for JP2011529429, Sep. 30, 2013, JPO.
English Translation of Office Action for JP2011529429, Sep. 30, 2013, JPO.
Mubea drawing Assembly, longitudinal view, Date Unknown, Mubea.

* cited by examiner

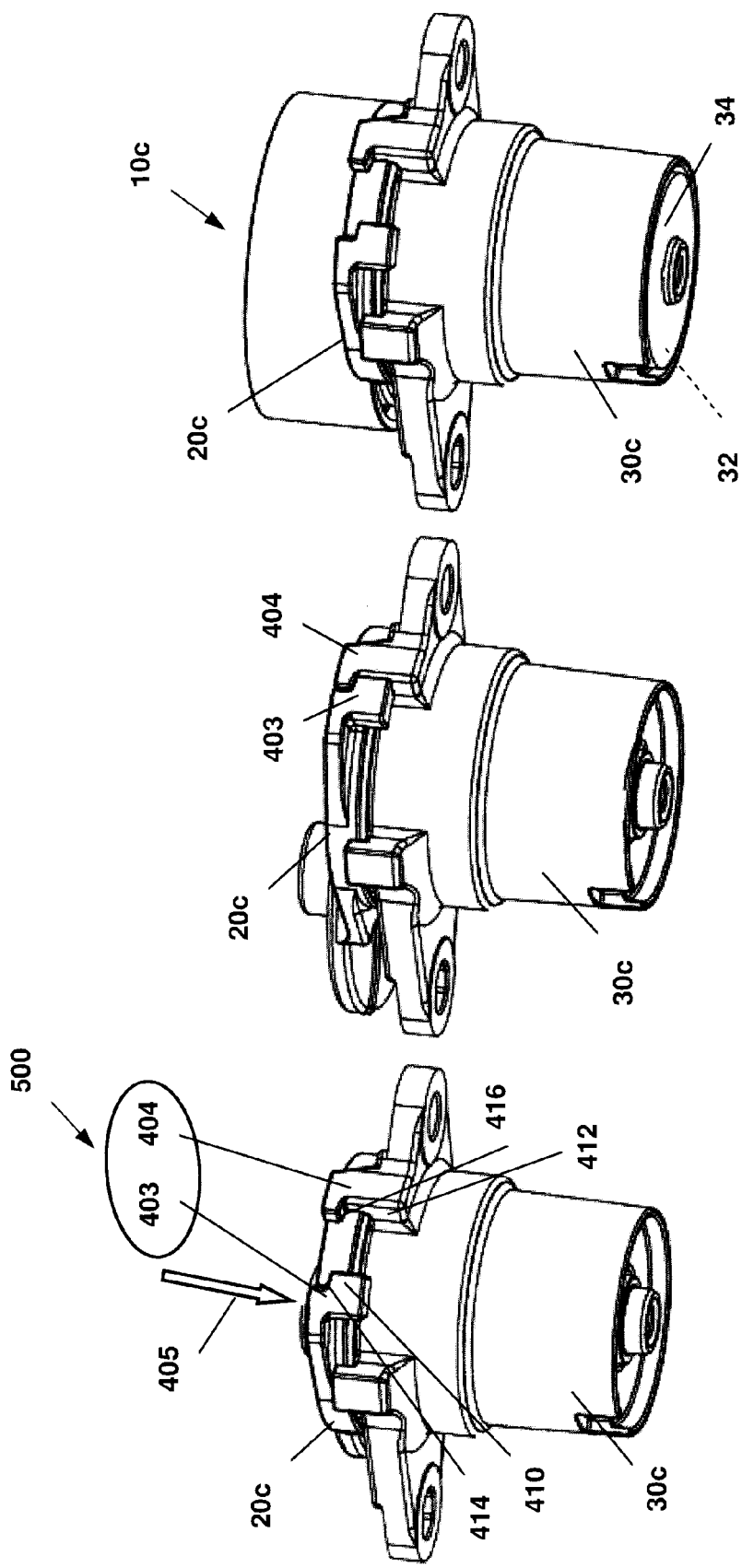

COMPACT TENSIONER WITH SUSTAINABLE DAMPING

The present invention generally relates to a tensioner that is employed to tension an endless power transmitting element.

Mechanical tensioners are employed to automatically control the tension in an endless power transmitting element, such as a belt or a chain. Typically, mechanical tensioners employ an arm that pivots about a base and a torsion spring that biases the arm in a predetermined rotational direction. Torsional damping is sometimes needed to ensure that the endless power transmitting element, or a component driven by the endless power transmitting system, is not overstressed. Several known damping tensioners can be costly to manufacture and/or do not provide for consistent damping performance throughout the life of the tensioner and/or can subject a pivot bushing the arm and the base to relatively high forces, which can result in pulley misalignment as the pivot bushing wears. Accordingly, there remains a need in the art for an improved damping tensioner.

SUMMARY

This section provides a general summary of some aspects of the present disclosure and is not a comprehensive listing or detailing of either the full scope of the disclosure or all of the features described therein.

In one form, the present disclosure provides a tensioner assembly that includes a base, a stem, an arm member, a brake drum, a spring reaction member, a helical coil spring, a pivot bushing, a wheel and a damping mechanism. The stem is pivotally coupled to the base about a first axis. The arm member is fixed to the stem. The brake drum is coupled to one of the base and the arm member. The spring reaction member is coupled to the other one of the base and the arm member. The helical coil spring is disposed about the stem and has a plurality of coils that are disposed between a first end and a second end. The first end is engaged to the brake drum and the second end is engaged to the spring reaction member. The helical coil spring biases the arm member in a first rotational direction relative to the base. Rotation of the arm member in a second rotational direction opposite the first rotational direction applies a torque to the helical coil spring that causes at least a portion of the plurality of coils to expand in a radial direction. The pivot bushing is disposed between the stem and the base. The wheel is mounted to the arm member for rotation about a second axis that is parallel to and radially offset from the first axis. The damping mechanism includes a damping element that is frictionally engaged with the brake drum. The damping element is received between the helical coil spring and the brake drum. The damping element is arranged along the first axis between the pivot bushing and the wheel and is urged radially outwardly into contact with a surface of the brake drum by at least one of the plurality of coils.

In another form, the present disclosure provides a tensioner assembly that includes a base, a stem, an arm member, a brake drum, a spring reaction member, a helical coil spring, a pivot bushing and a damping mechanism. The stem is pivotally coupled to the base about a first axis. The arm member is fixed to the stem. The brake drum is coupled to one of the base and the arm member. The spring reaction member is coupled to the other one of the base and the arm member. The helical coil spring is disposed about the stem and has a plurality of coils that are disposed between a first end and a second end. The first end is engaged to the brake drum and the second end is engaged to the spring reaction member. The helical coil spring biases the arm member in a first rotational direction relative to the base. Rotation of the arm member in a second rotational direction opposite the first rotational direction applies a torque to the helical coil spring that causes at least a portion of the plurality of coils to expand in a radial direction. The pivot bushing is disposed between the stem and the base. The damping mechanism is received between the helical coil spring and the brake drum and includes a flexible damping element. The arm is positionable relative to the base in a predetermined range of operating positions. In one of the operating positions a load exerted into the helical coil spring by the spring reaction member urges the helical coil spring against the damping mechanism such that the damping element frictionally engages the brake drum and a reaction force exerted the brake drum onto the damping mechanism is directed in a direction opposite the load exerted onto the helical coil spring and extends perpendicular to the first axis.

In still another form, the present disclosure provides a tensioner assembly that includes a base, a stem, an arm member, a brake drum, a spring reaction member, a helical coil spring, a pivot bushing and a wheel. The stem is pivotally coupled to the base about a first axis. The arm member is fixed to the stem. The brake drum is coupled to one of the base and the arm member. The spring reaction member is coupled to the other one of the base and the arm member. The helical coil spring is disposed about the stem and has a plurality of coils that are disposed between a first end and a second end. The first end is engaged to the brake drum and the second end is engaged to the spring reaction member. The helical coil spring biases the arm member in a first rotational direction relative to the base. Rotation of the arm member in a second rotational direction opposite the first rotational direction applies a torque to the helical coil spring that causes at least a portion of the plurality of coils to expand in a radial direction. The pivot bushing is disposed between the stem and the base. The arm is positionable relative to the base in a predetermined range of operating positions. In one of the operating positions a load exerted by the helical coil spring onto the spring reaction member is directed in a direction opposite a hub load, which is applied to the arm to position the arm at the one of the operating positions, and a bushing load, which is applied to the pivot bushing, such that the hub load and the bushing load counteract the load exerted by the helical coil spring.

In yet another form, the present disclosure provides a tensioner assembly having a base, an arm, a spring, a first engagement feature coupled to the base, and a second engagement feature. The arm that pivots relative to the base between a first rotary position and a second rotary position. The spring biases the arm toward the first rotary position. The second engagement feature is coupled to the arm and is disposed axially in-line with the first engagement feature when the arm is in the first rotary position to resist axial separation of the arm from the base. The second engagement feature is not disposed axially in-line with the first engagement feature when the arm is positioned in the second rotary position.

Further areas of applicability will become apparent from the description provided herein. It should be understood that the description and specific examples in this summary are intended for purposes of illustration only and are not intended to limit the scope of the present disclosure, its application and/or uses in any way.

BRIEF DESCRIPTION OF THE DRAWINGS

The drawings described herein are for illustrative purposes only and are not intended to limit the scope of the present disclosure in any way. The drawings are illustrative of selected teachings of the present disclosure and do not illus

FIGS. 23A through 23C are perspective views illustrating an assembly process in which features formed onto the base and arm of the tensioner assembly are engaged to one another to maintain the arm of the tensioner assembly in a predetermined axial position relative to the base during a portion of the assembly process;

DETAILED DESCRIPTION OF THE VARIOUS EMBODIMENTS

Figure 1:
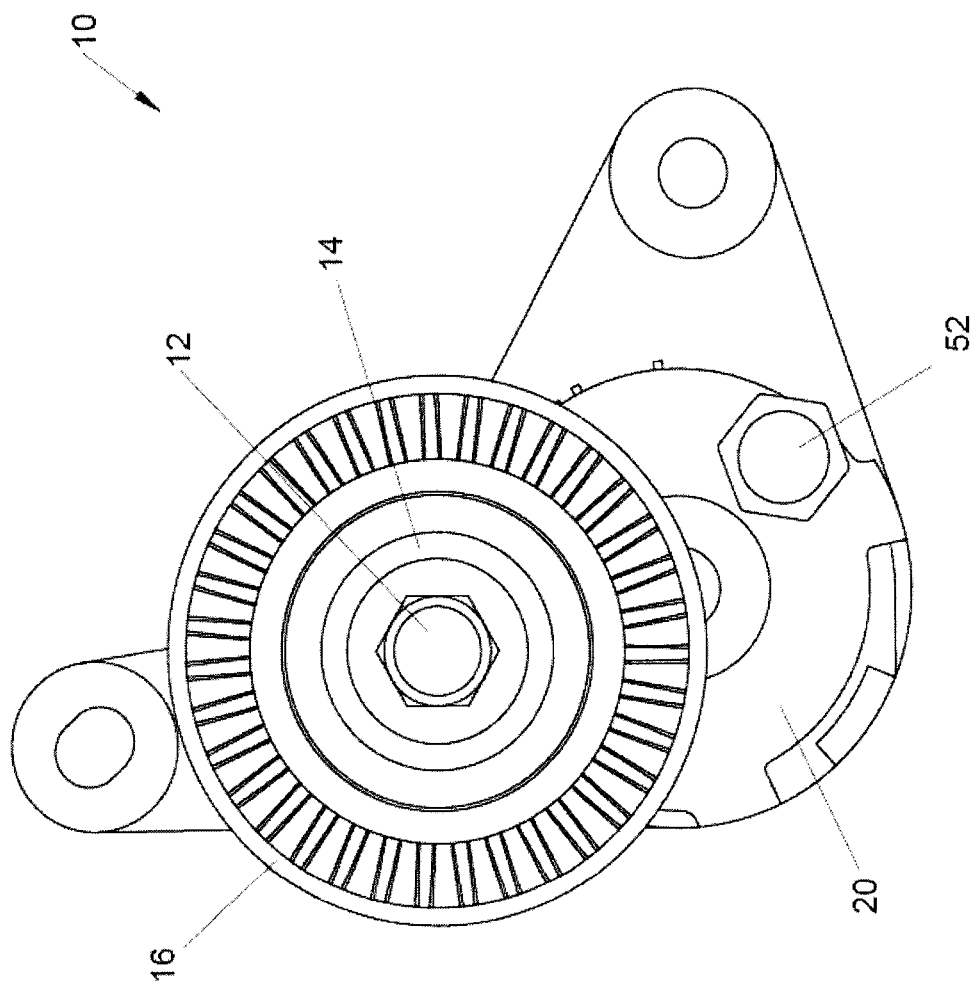
- FIG. 1 is a top plan view of a tensioner assembly constructed in accordance with the teachings of the present disclosure.
Figure 2:
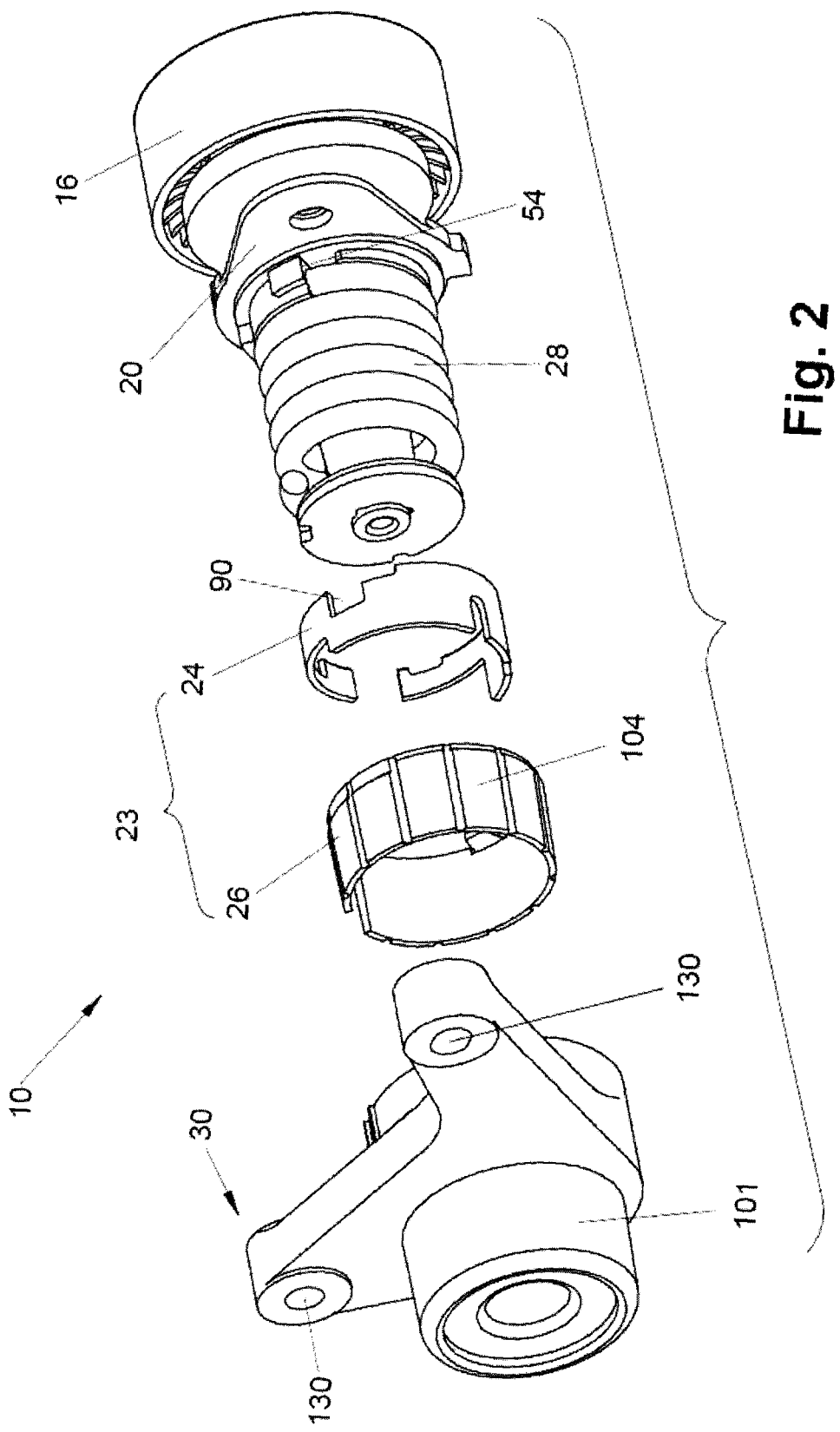
FIGS. 2 and 3 are exploded perspective views of the tensioner assembly of FIG. 1.
Figure 3:
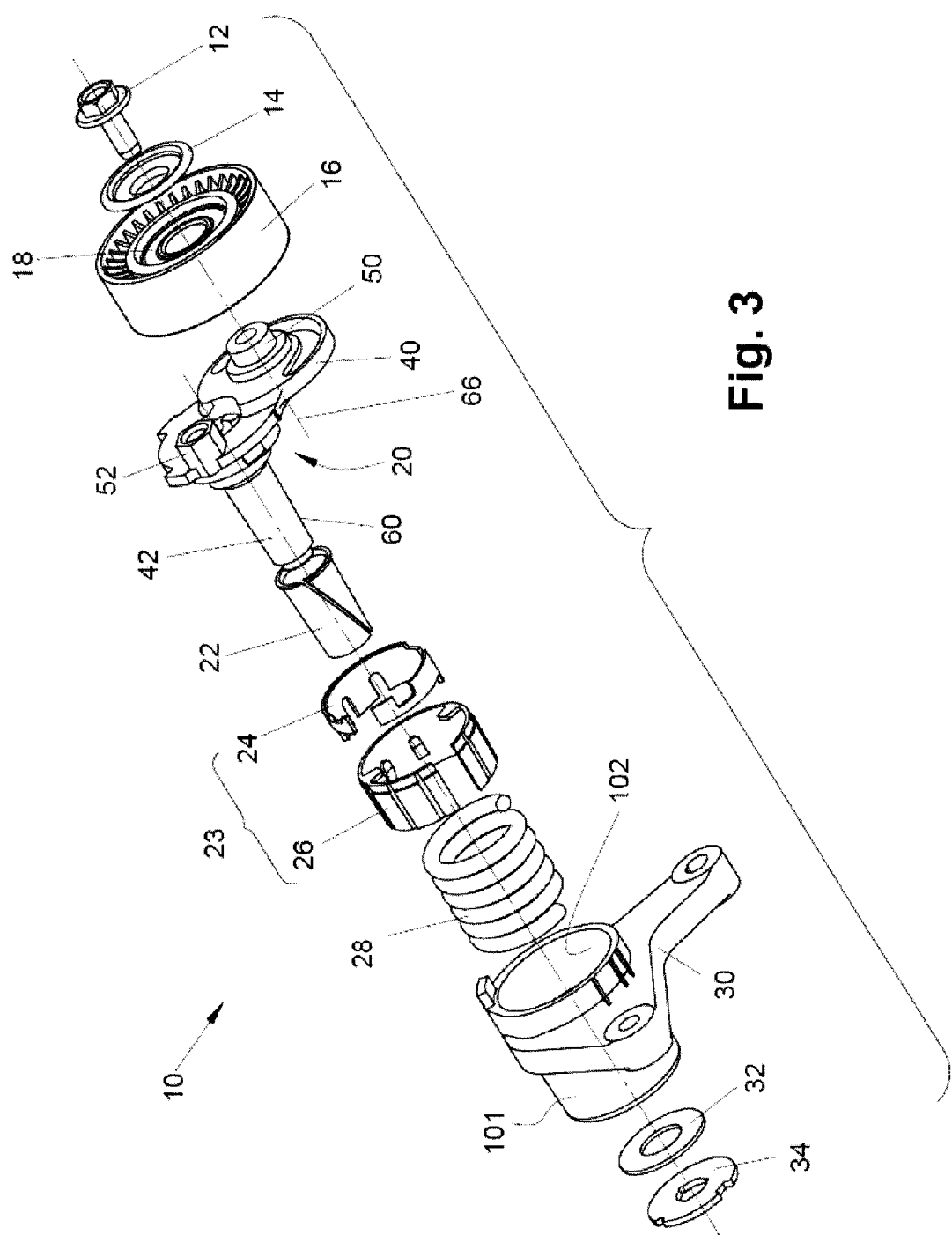
Figure 5:
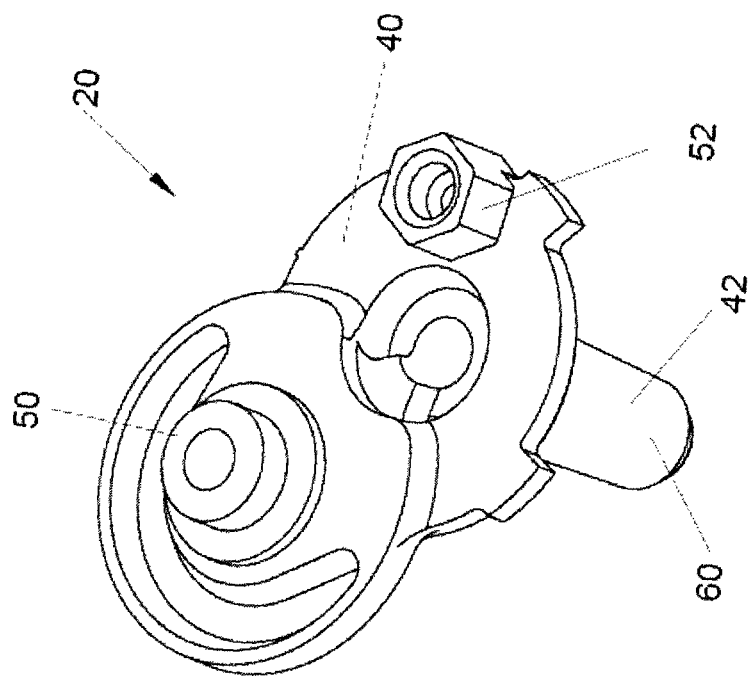
FIGS. 4 and 5 are perspective views of a portion of the tensioner assembly of FIG. 1 illustrating the arm in more detail.

With reference to FIGS. 1-3 of the drawings, a tensioner assembly constructed in accordance with the teachings of the present disclosure is generally indicated by reference numeral 10. The tensioner assembly 10 can include a fastener 12, a dust shield 14, a wheel 16, a bearing 18, an arm 20, a pivot bushing 22, a damping mechanism 23 (which can comprise a sleeve 24 and a damping element 26), a spring 28, a bracket or base 30, a thrust washer 32 and a thrust plate 34. The fastener 12, the dust shield 14, the bearing 18 and the thrust washer 32 can be generally conventional in their configuration and as such, need not be discussed in detail herein.

With reference to FIGS. 2 through 5, the arm 20 can be unitarily formed in a suitable process, such as die casting, and can define an arm member or portion 40 and a stem member or portion 42. The arm portion 40 can include a bearing mount 50, a lifting member 52, a spring reaction member 54 and a spring support 56, while the stem portion 42 can include a stem 60. The bearing mount 50 can be formed onto a first side of the arm portion 40 and can be configured to be received into an inner bearing race 18-1 of the bearing 18 to support the wheel 16 for rotation about a first axis 66. The fastener 12 can be threadably engaged to the bearing mount 50 and can cooperate with the dust shield 14 and the bearing 18 to rotatably mount the wheel 16 to the arm portion 40. The lifting member 52 can be formed on the first side of the arm portion 40 and can be configured to be engaged by a tool (not shown) to pivot the arm portion 40 about a second axis 68 that extends through the stem portion 42. While the wheel 16 has been illustrated in the particular example as being a generally cylindrically shaped roller, it will be appreciated that the wheel could include teeth, grooves and/or other features. Accordingly, it will be appreciated that the wheel 16 could be a sprocket or a pulley in the alternative.

Figure 4:
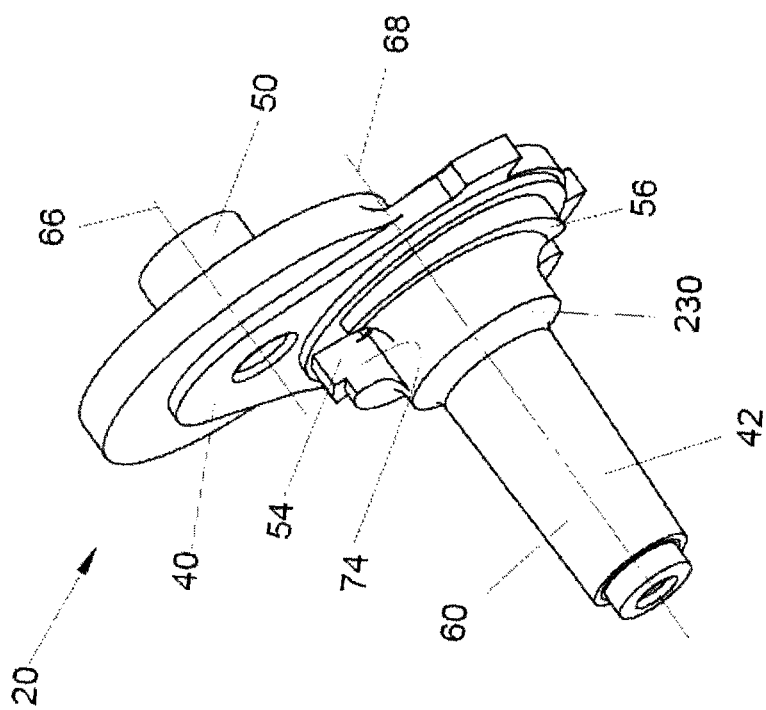
Figure 6:
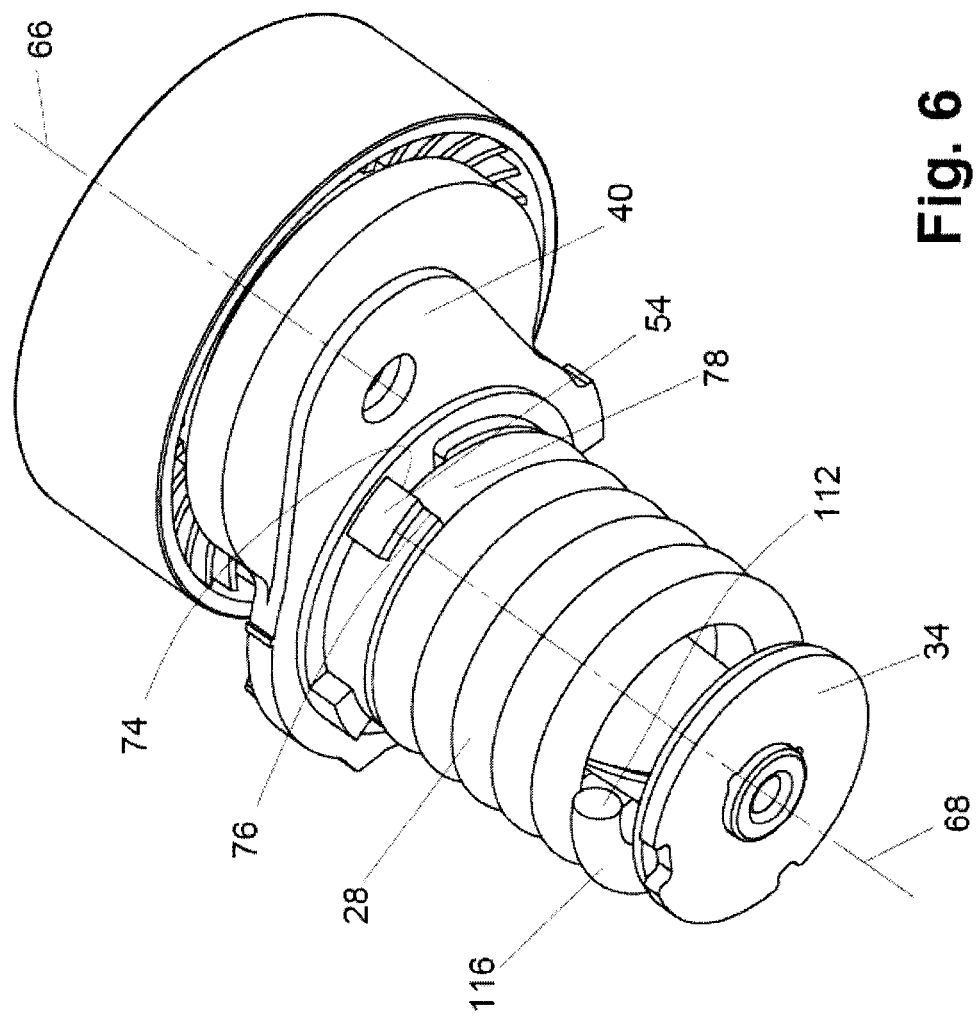
FIG. 6 is a perspective view of a portion of the tensioner assembly of FIG. 1 illustrating the arm and the spring in greater detail.

With reference to FIGS. 4 and 6, the spring reaction member 54 can be offset from the second axis 68 and can be configured to engage the spring 28 to permit the spring 28 to apply a force to the arm portion 40 that tends to rotate the arm portion 40 about the second axis 68. In the particular example provided, the spring reaction member 54 is a block-like nub having an end face 74 that is configured to abut an end face 76 of a first helical coil 78 of the spring 28. It will be appreciated, however, that the spring reaction member 54 and the spring 28 can be configured somewhat differently as will be discussed in detail, below. The spring support 56 can be helically shaped and can be configured to support the first helical coil 78 of the spring 28.

Figure 7:
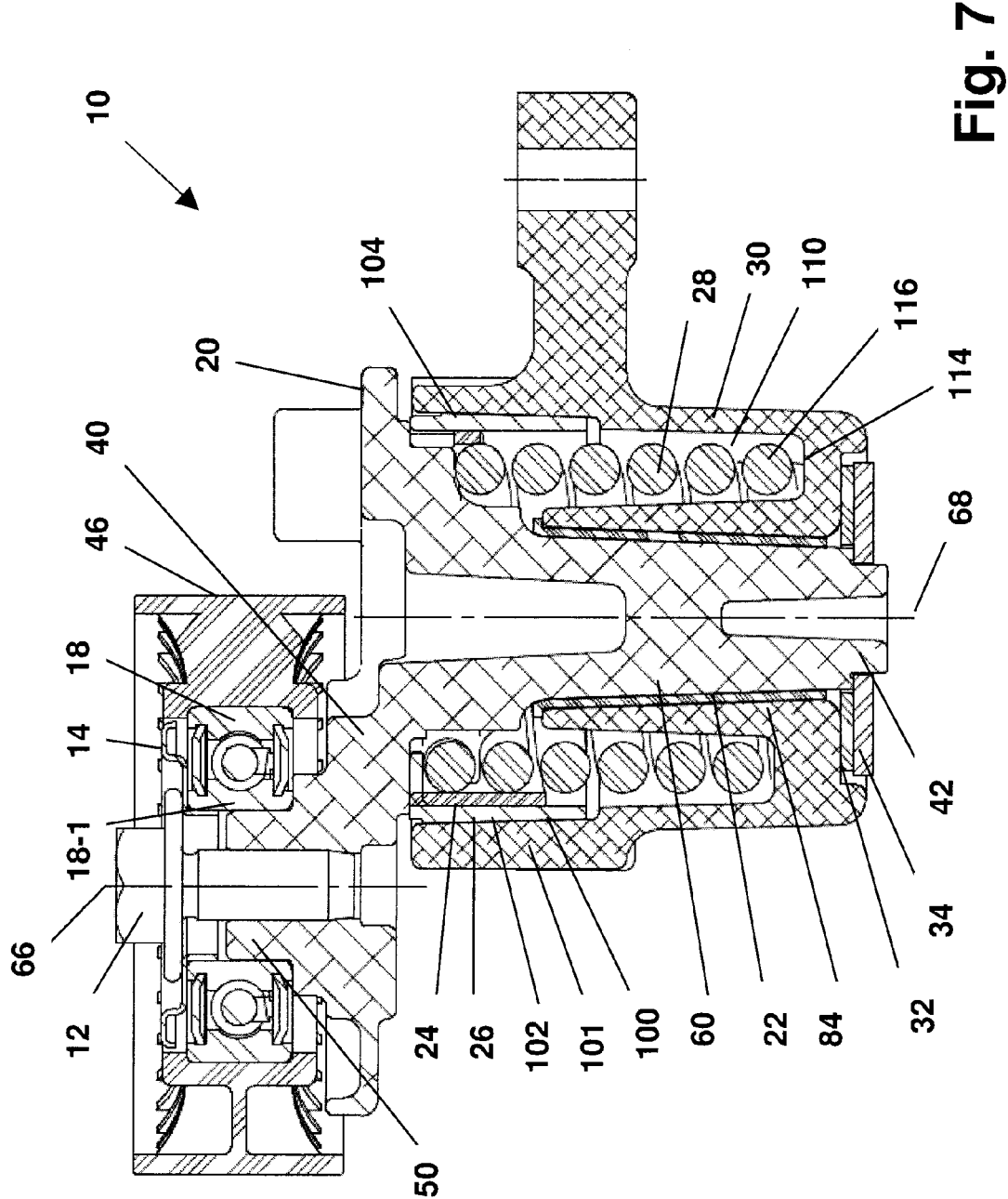
FIG. 7 is a sectional view of the tensioner assembly of FIG. 1.

With reference to FIGS. 3, 4 and 7, the stem 60 can be disposed on a side of the arm portion 40, such as the side opposite the bearing mount 50, and can be configured to receive the pivot bushing 22 and the spring 28. In the particular example provided, the stem 60 is tapered (i.e., the stem 60 has a frusto-conical shape) such that it converges with increasing distance from the arm portion 40.

With reference to FIGS. 3 and 7, the pivot bushing 22 can have a tapered configuration that is configured to be received over the stem 60 and matingly received into a bushing aperture 84 formed in the base 30. In the particular example provided, the bushing aperture 84 also employs a tapered (i.e., frusto-conical) shape. It will be appreciated from this disclosure that the pivot bushing 22 can support the arm 20 relative to the base 30 for rotation about the second axis 68.

With reference to FIGS. 2 and 7, the sleeve 24 can be formed of an appropriate material, such as steel, and can be configured to engage the spring 28 and distribute the force exerted by the spring 28 onto the damping element 26. In the example provided, the sleeve 24 includes a window 90 into which the spring reaction member 54 can be received to thereby non-rotatably couple the sleeve 24 to the arm 20. Note that the sleeve 24 can be shaped to distribute load between the spring 28 and the damping element 26 in a desired manner.

Figure 8:
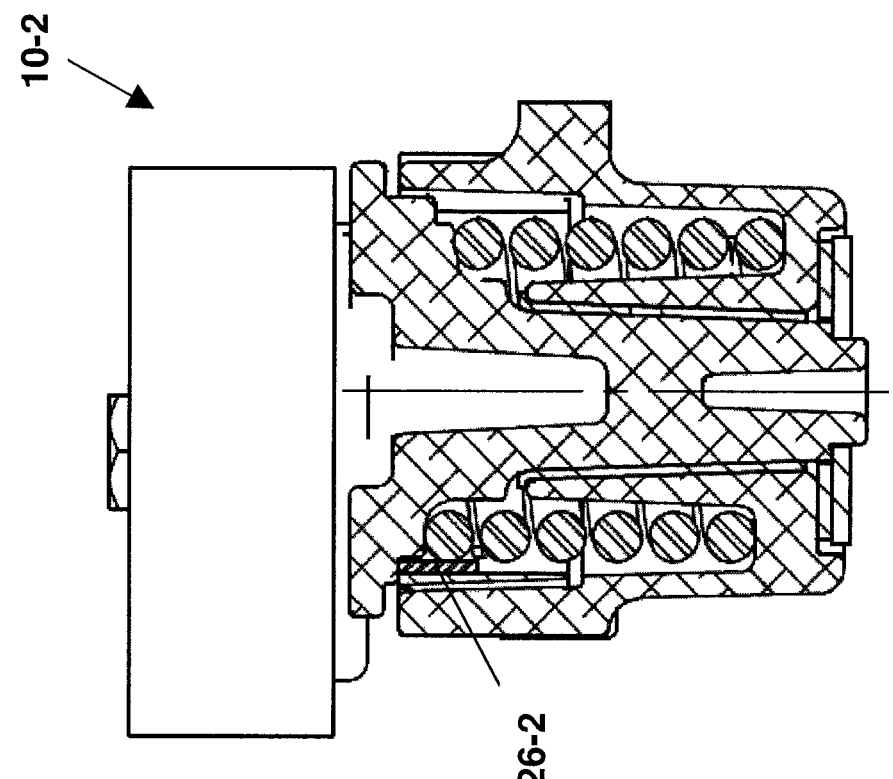
FIGS. 8 and 9 are sectional views of a tensioner similar to that of FIG. 1 but illustrating the tensioner assemblies with differently sized damping elements.
Figure 9:
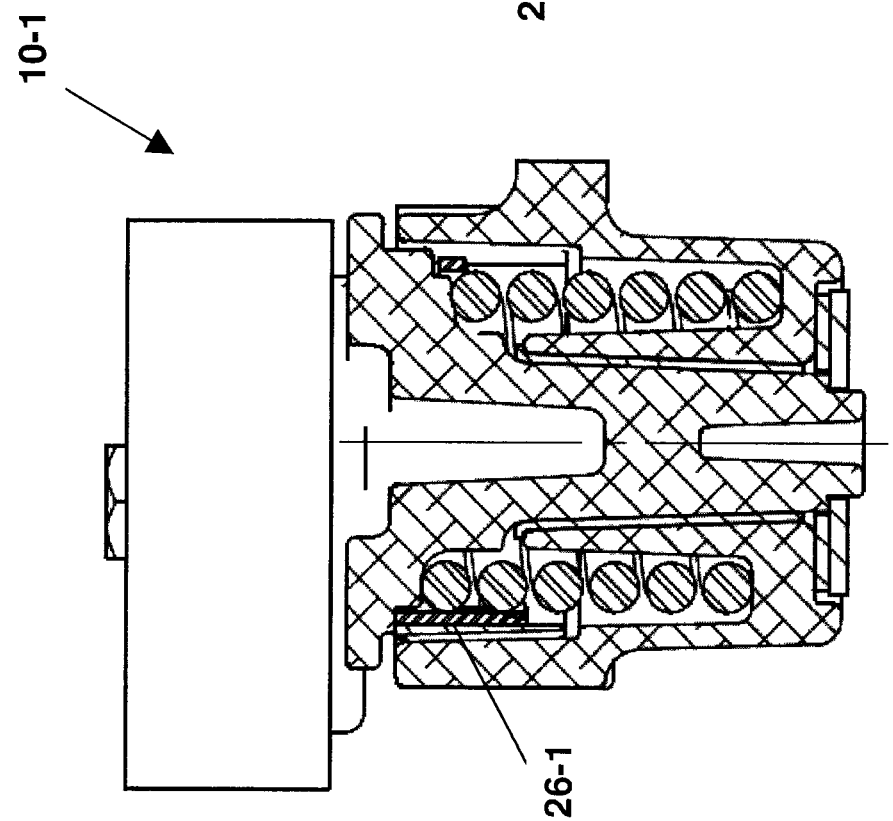

The damping element 26 can be formed of a resilient material, such as an unfilled (non-reinforced) nylon so as to flexibly conform to the interior surface of a cylindrically-shaped brake drum aperture 100 formed in a brake drum 101 that can be coupled to the base 30. The damping element 26 can be non-rotatably engaged to the sleeve 24, as well as received into the brake drum aperture 100. The damping element 26 can contact the circumferential surface 102 of the brake drum aperture 100 to dampen the torque that is transmitted about the second axis 68. It will be appreciated from this disclosure that the surface 104 of the damping element 26 that contacts the circumferential surface 102 of the brake drum aperture 100 can be configured in a desired manner to control the distribution of force at given points along the surface 104 of the damping element 26. With reference to FIGS. 8 and 9, tensioner assembly 10-1 is illustrated to including a damping element 26-1 that is relatively taller than the damping element 26-2 of the tensioner assembly 10-2. Those of skill in the art will appreciate that contact over a relatively smaller area can facilitate cost reduction of the tensioner assembly (through a reduction of material to form the damping element) but can increase the load on the damping element. Configuration of the tensioner assembly in this manner permits the surface area of the sleeve and/or damping element to be easily tailored to a given situation.

Figure 19:
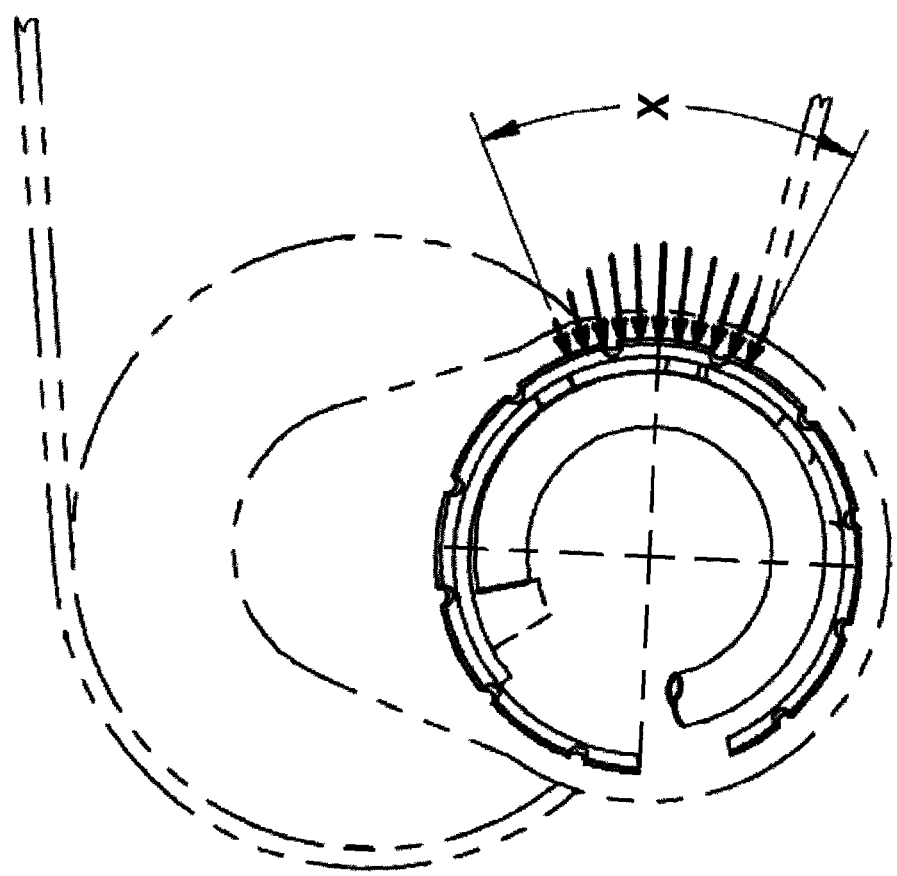
FIGS. 19 and 20 are views of a portion of the tensioner of FIG. 1 schematically depicting the distribution of damping force under different load conditions.
Figure 20:
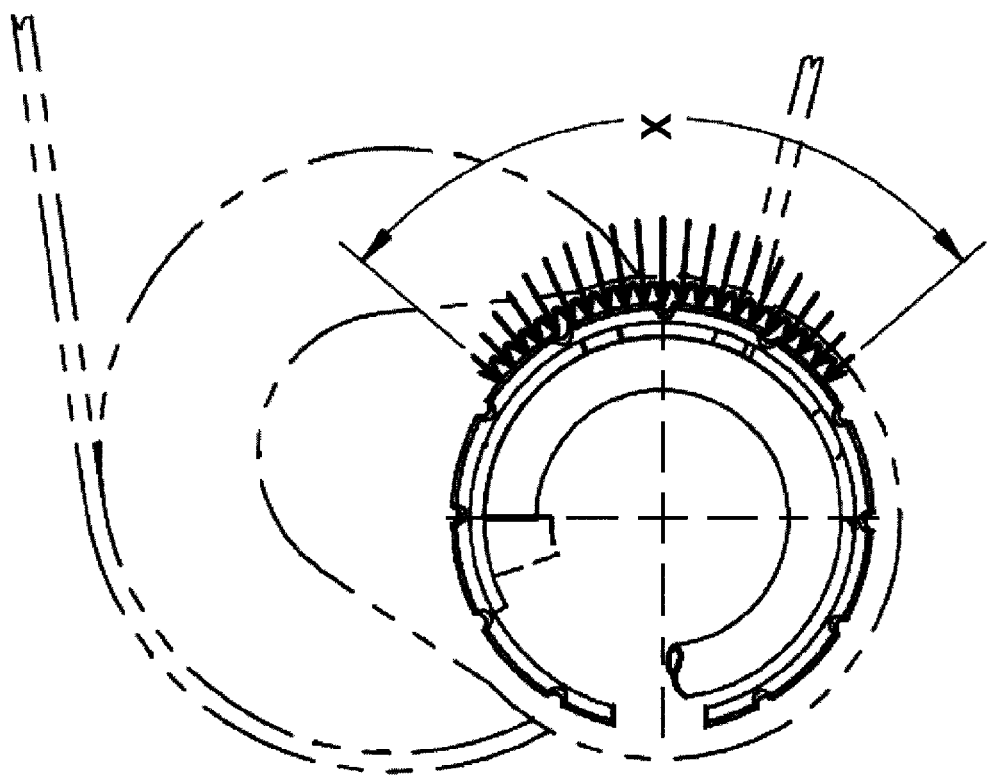

With reference to FIGS. 19 and 20, the curvature of the spring 28 can vary as a function of torque transmitted through the spring 28. As tensioner load increases or decreases, the arc X of contact between spring 28 and damping mechanism 23 can vary (i.e., increase or decrease, respectively) such that the area over which the load is transmitted between the damping mechanism 23 and the base 30 can correspondingly increase or decrease, respectively. Accordingly, a desired range of pressure on the damping element 26 may be maintained.

Returning to FIGS. 2 and 7, the spring 28 can be received into a spring pocket 110 formed in the base 30 concentric with the stem 60. An end 112 (FIG. 6) of the spring 28 opposite the spring reaction member 54 (FIG. 4) can engage the base 30 in a desired manner. For example, the spring pocket 110 can include a groove 114 into which a last coil 116 of the spring 28 can be received and the groove 114 can terminate at an end face (not specifically shown) that is perpendicular to the axis of the wire that forms the last coil 116 so that an end face 112 (FIG. 6) of the last coil 116 can be abutted against the end face of the groove 114 It will be appreciated that the groove 114 can be configured to support the last coil 116 in a desired manner at one or more locations along its (helical) length.

The base 30 can include a plurality of mounting bosses 130 that are configured to receive threaded fasteners 132 when the base 30 is fixedly coupled to a structure, such as an engine block (not shown). The base 30 can be formed of a desired material, such as aluminum, in an appropriate process, such as die casting.

In FIGS. 3 and 7, the thrust plate 34 can be fixedly coupled to an end of the stem 60 that extends through the base 30 so that the arm 20 is axially fixed but rotatable relative to the base 30. The thrust washer 32, which can be received between the thrust plate 34 and the base 30, can be employed to control the friction between the base 30 and the thrust plate 34, as well as to control the compressive force acting on the spring 28.

Figure 11:
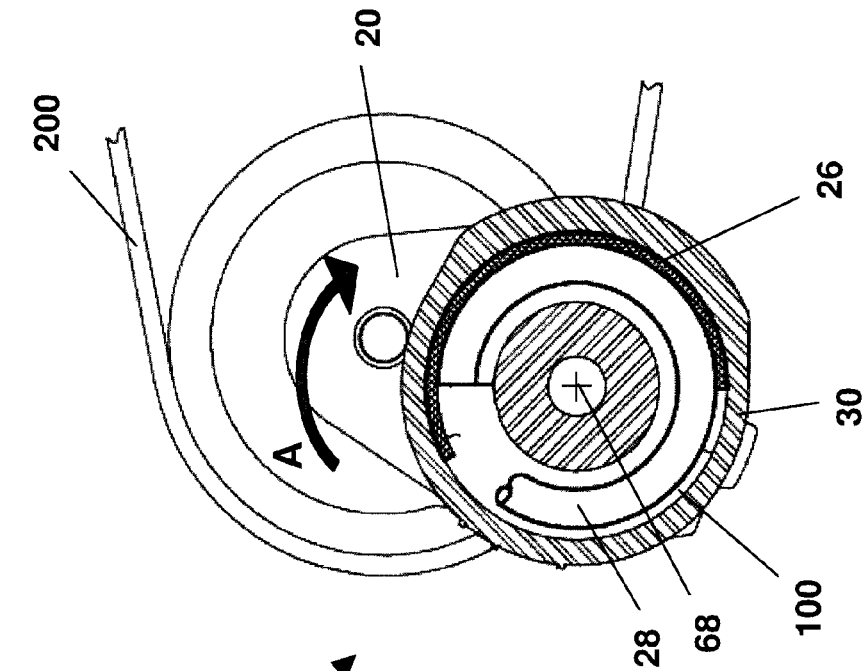
FIGS. 10 and 11 are sectional views of the tensioner assembly of FIG. 1 illustrating the damping element and the spring relative to the brake drum when the damping element is new (FIG. 10) and when the damping element is worn (FIG. 11)
Figure 10:
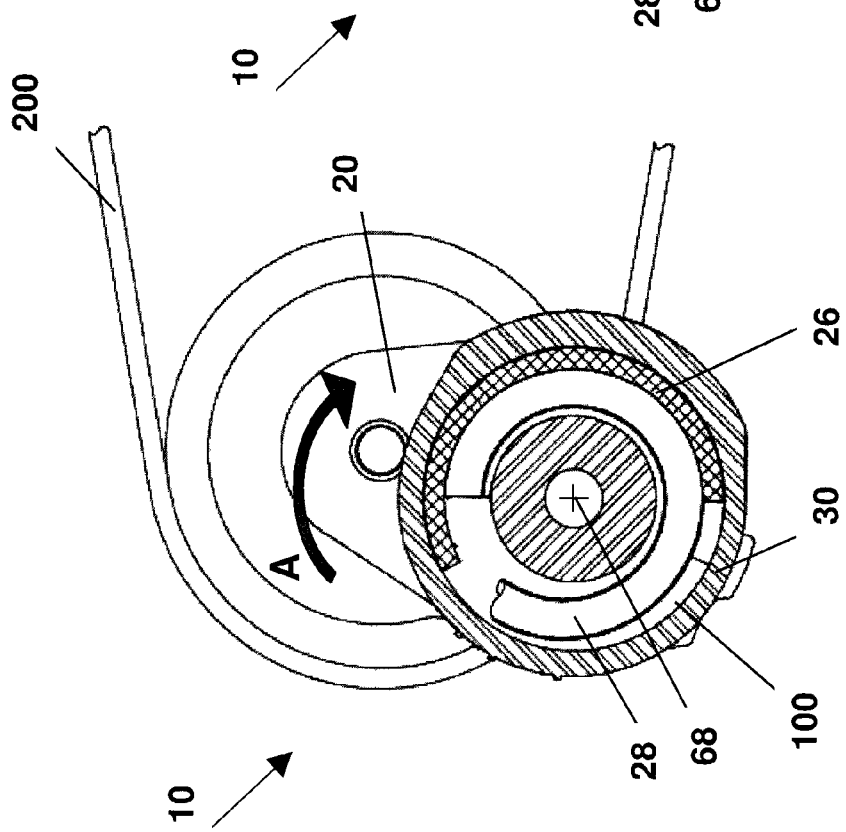

In operation, the arm 20 can be rotated about the second axis 68 to apply tension to an endless power transmitting element, such as a chain or a belt 200 as shown in FIG. 10. Rotation of the arm 20 in the direction of arrow A can cause the spring 28 to open or expand about the second axis 68 such that an outwardly directed force is applied through the sleeve 24 to the damping element 26. As the damping element 26 is flexible, it can conform to the brake drum aperture 100 in the base 30, even if the damping element 26 has experienced significant wear as is shown in FIG. 11. Note that the damping element 26 is represented in FIG. 11 as being relatively thinner than in FIG. 10 and that the spring 28 is shifted radially outwardly in FIG. 11 relative to the depiction in FIG. 10 to illustrate that the spring 28 can compensate for wear experienced by the damping element 26. Consequently, the tensioner assembly 10 is able to provide consistent damping and torque (and therefore belt tension) throughout the life of the tensioner assembly 10. Moreover, it will be appreciated that the force generated by the spring 28 is applied to the arm 20 in a direction that is tangent with the last coil 116 as shown in FIG. 6.

Figure 12:
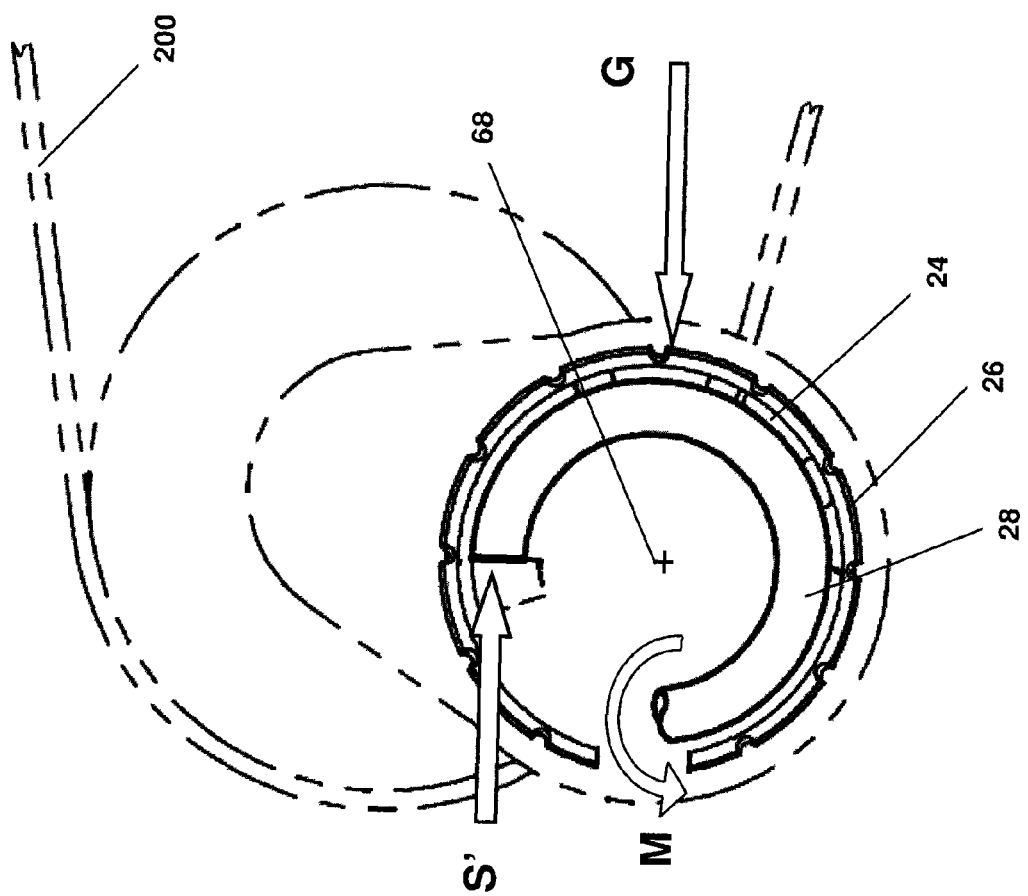
FIG. 12 is a view of a portion of the tensioner assembly of FIG. 1 schematically illustrating the spring load and the grounding force as applied to the tensioner assembly.

With reference to FIGS. 7 and 12, a grounding force G acts on the damping element 26 as a result of the spring load S' generated by the tension of the belt 200. A damping force applied to the circumferential surface 102 of the brake drum aperture 100 is related proportionally to the grounding force G. As such, the damping force is not dependent upon radial pre-loading and does not substantially change even if the damping element 26 is significantly worn. Note, too, that the spring load S' can be directed tangent to the coils of the spring 28, and that the grounding force G can be directed parallel to the spring load S' and perpendicular to the second axis 68 (i.e., the grounding force G is transmitted in a direction that intersects the second axis 68).

Figure 13:
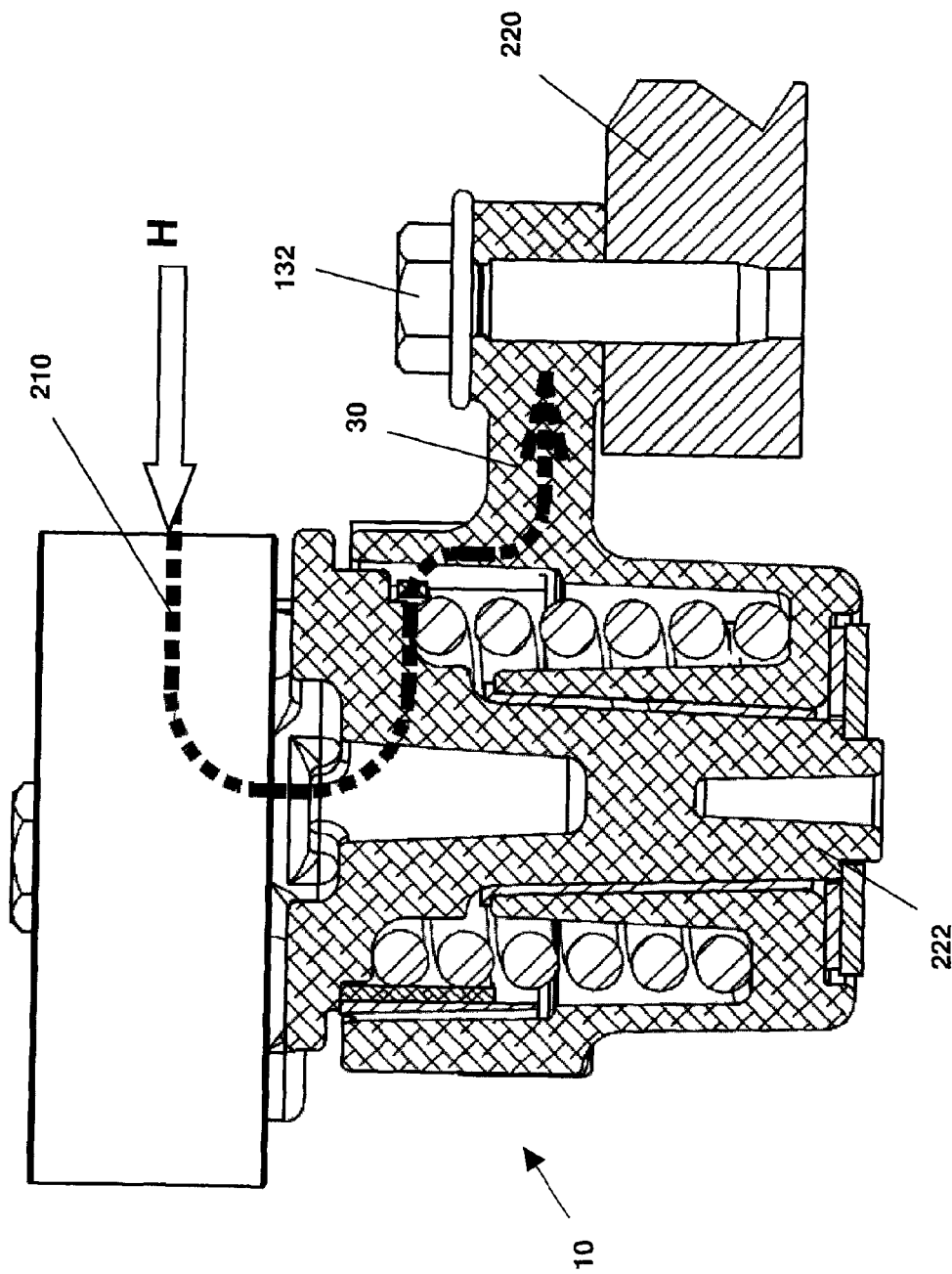
FIG. 13 is a section view of the tensioner assembly of FIG. 1 schematically illustrating the path along which the hub load is transmitted through the tensioner assembly to the base.
Figure 14:
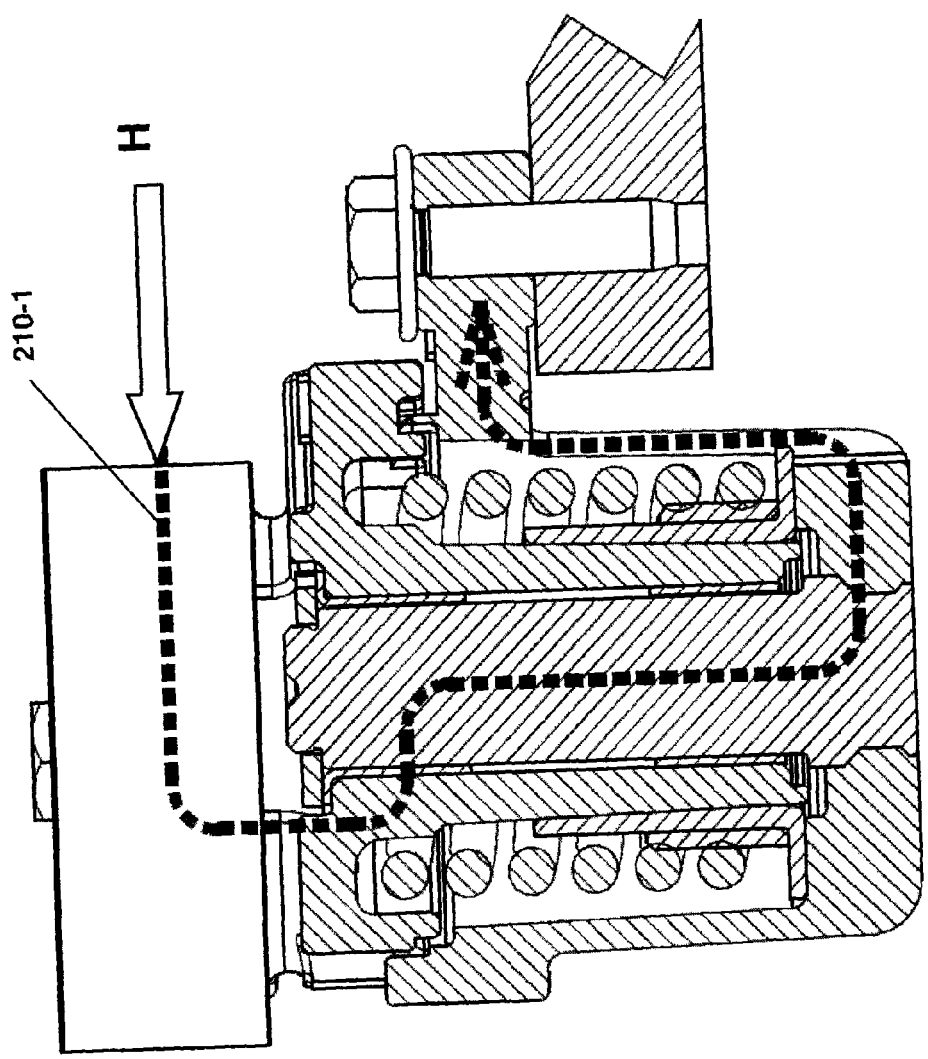
FIG. 14 is a section view of a prior art tensioner assembly schematically illustrating the path along which the hub load is transmitted through the prior art tensioner assembly to its mounting base.

With reference to FIG. 13, the load path 210 for transmission of the hub load H through various components of the tensioner assembly 10 is schematically illustrated. It will be appreciated that the configuration of the tensioner assembly 10 in the example provided configures the load transmission path 210 such that the hub load H is grounded directly or within close proximity to the points at which the base 30 is fixedly mounted to another structure, such as an engine 220. In contrast to the prior art embodiment illustrated in FIG. 14, configuration of the tensioner assembly 10 in this manner lowers the angular deflection of the tensioner assembly 10 as well as lowers the load that is transmitted through a distal end 222 of the stem 60. Those of skill in the art will appreciate that tensioner deflection can cause angular misalignment of the endless power transmitting element (e.g., belt).

Figure 15:
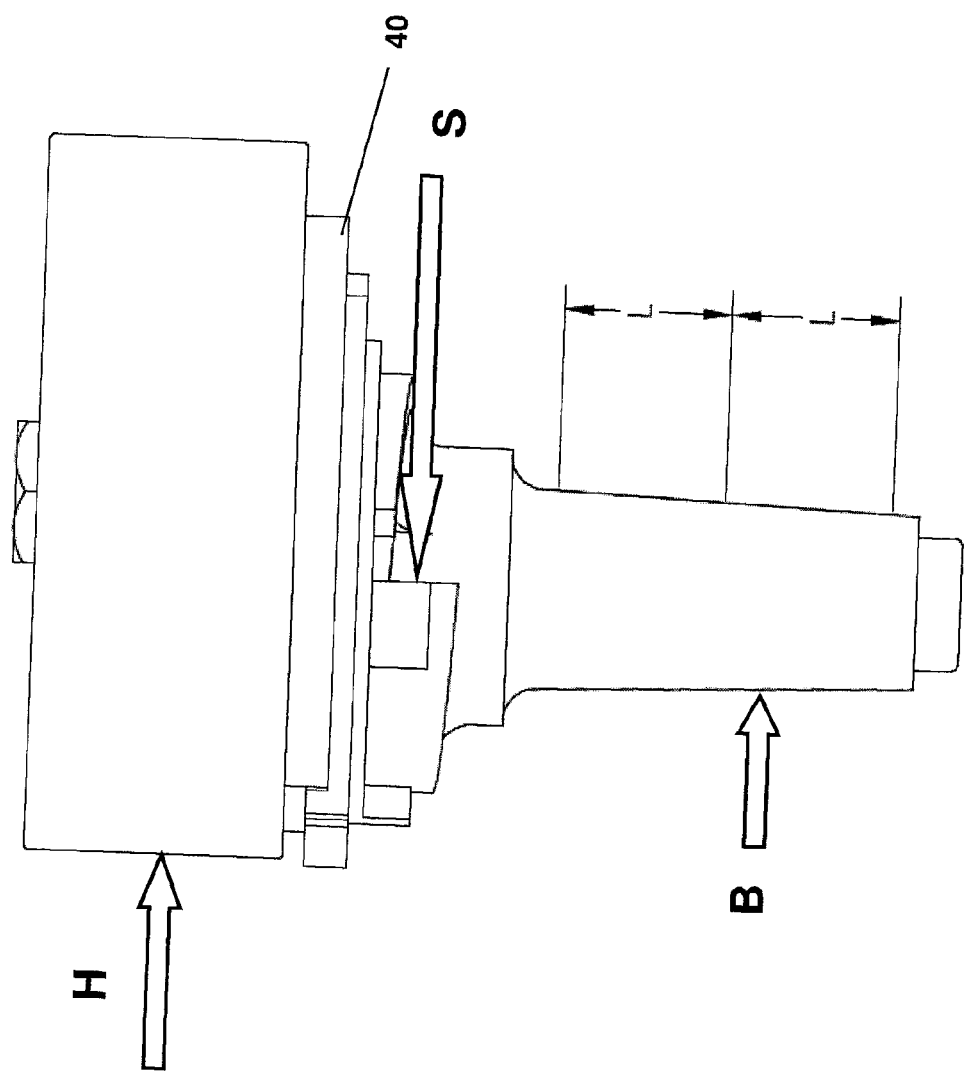
FIGS. 15 and 16 are free-body diagrams of a portion of the tensioner assembly of FIG. 1 that schematically illustrate the hub load, the spring reaction force and the bushing load that are applied to an illustrated portion of the tensioner assembly.
Figure 16:
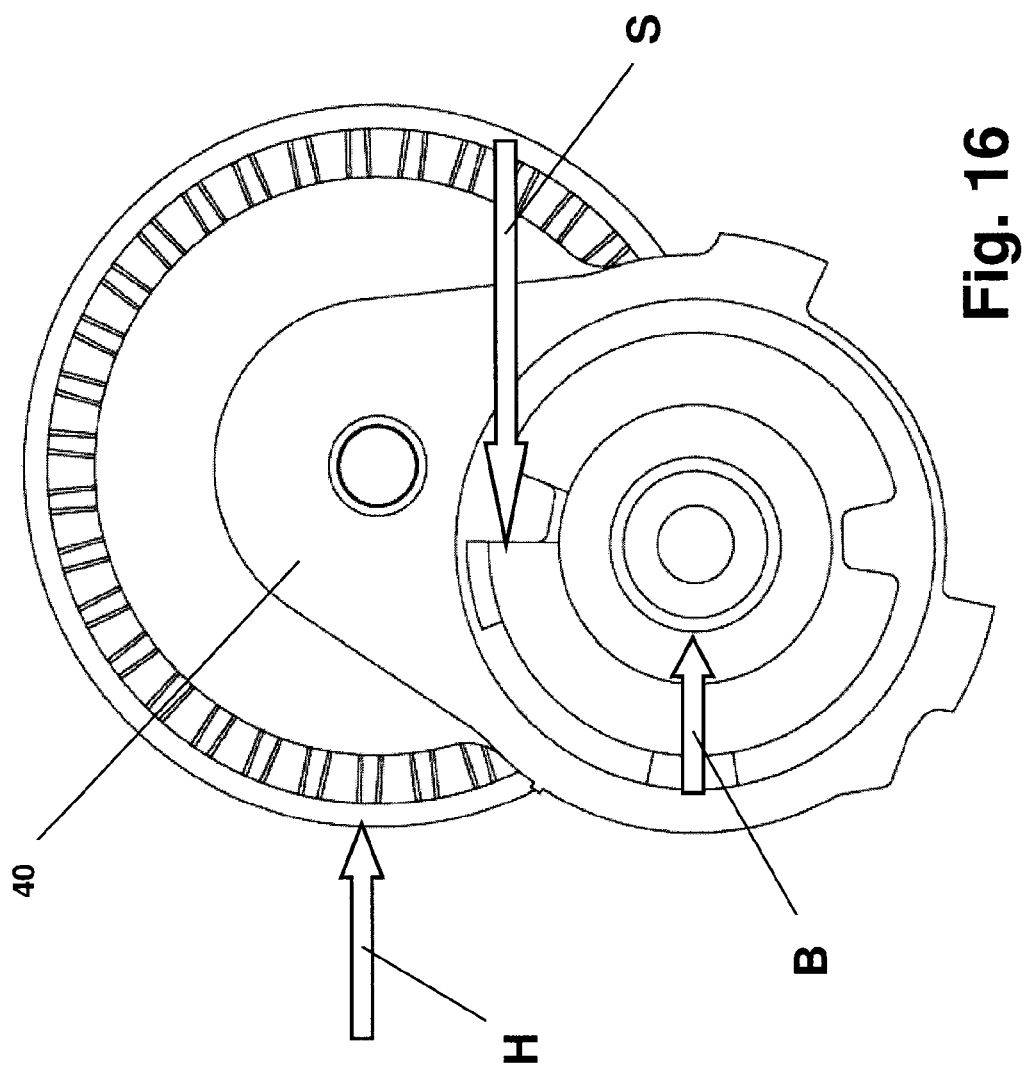

With reference to FIGS. 7, 15 and 16, the spring reaction force S directly balances the hub load H so that the load B on the pivot bushing 22 is relatively lower. Preferably, the load B is centrally located on the pivot bushing 22 along its length. In this regard, the hub load H and spring reaction force S are partially canceled directly on the arm portion 40 so that the pivot bushing 22 is only subject to the difference of the loads rather than their sum. Stated another way, the hub load H and the load B on the pivot bushing 22 (i.e., the bushing load) counteract the spring reaction force S. As a result of the load balancing, it is not necessary to provide a bushing surface in the area where the stem portion 42 (FIG. 4) intersects the arm portion 40 (FIG. 4). Consequently, the arm 20 can be configured with an enlarged section 230 (FIG. 4) at the point where the stem portion 42 (FIG. 4) intersects the arm portion 40 (FIG. 4) to thereby strengthen this portion of the arm 20.

Figure 17:
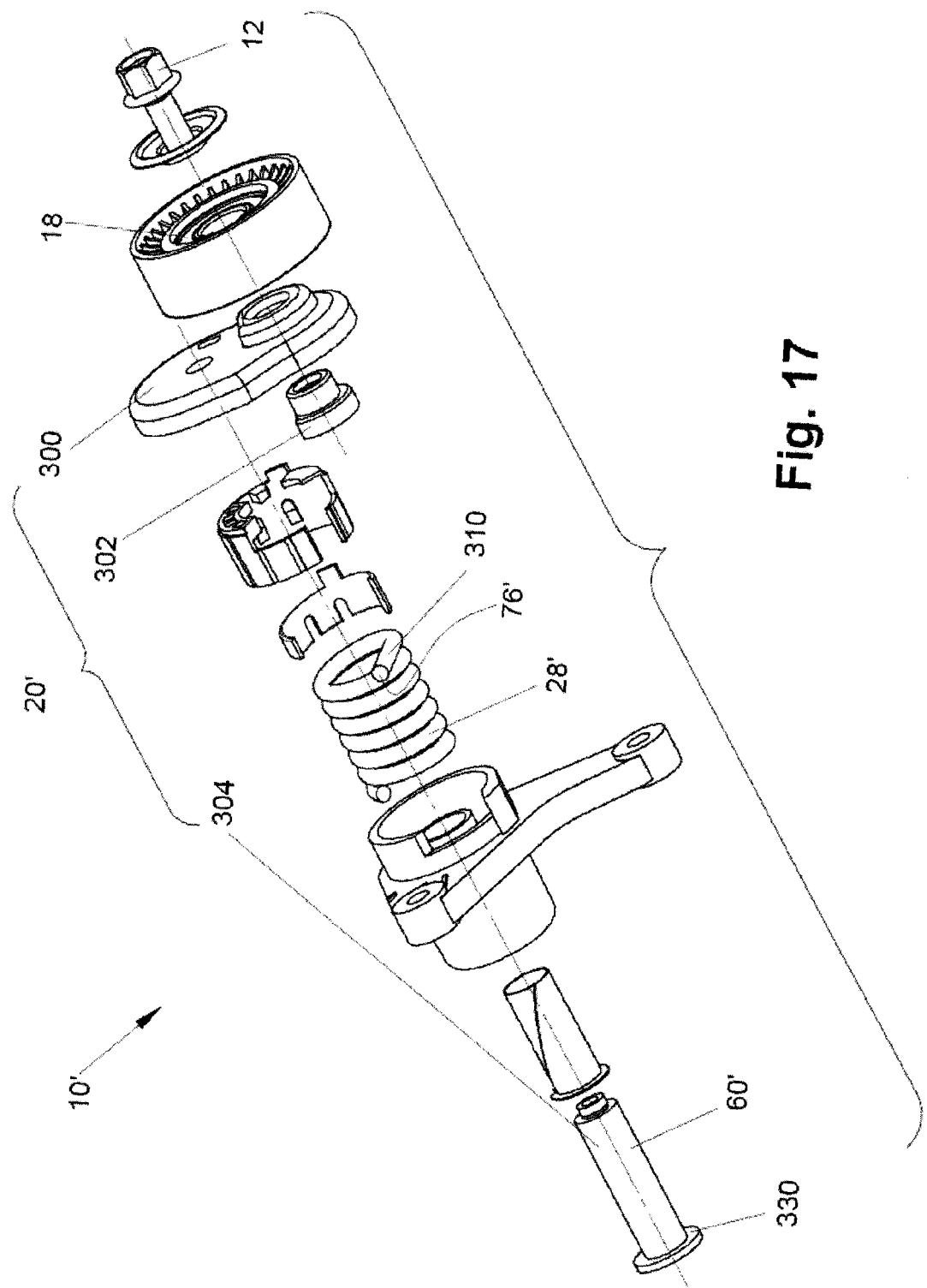
FIG. 17 is an exploded perspective view of another tensioner assembly constructed in accordance with the teachings of the present disclosure.
Figure 18:
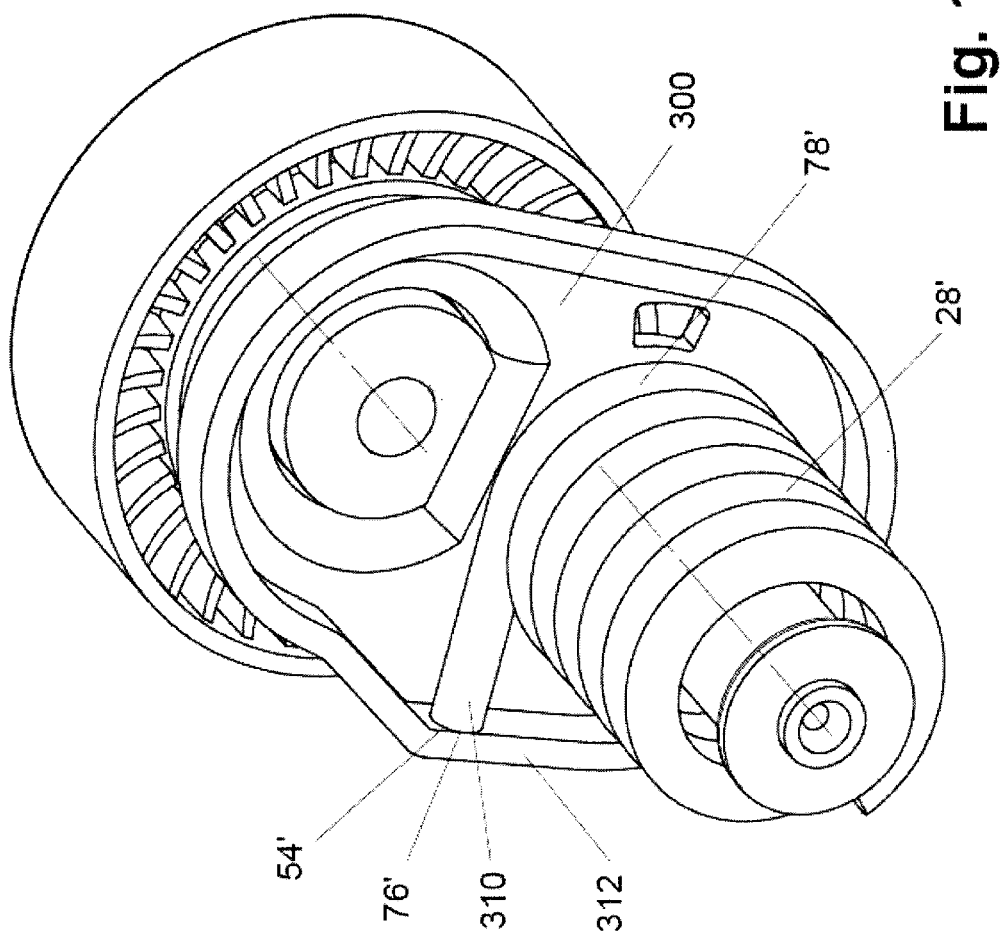
FIG. 18 is a perspective view of a portion of the tensioner assembly of FIG. 17 illustrating the arm and the spring in greater detail.

The tensioner assembly 10' of FIGS. 17 and 18 is generally similar to the above-described example and as such, similar reference numerals will be employed to identify similar features. In contrast to the tensioner assembly 10 of FIG. 1, the arm 20' of the tensioner assembly 10' can be formed of several discrete components, including a plate member 300, a nut 302 and an axle 304. The plate member 300 can be formed of steel in a progressive stamping operation and the nut 302 can be employed with the fastener 12 to fixedly couple the bearing 18 to the arm 20'. The spring 28' can include an elongated tang 310 that can be tangent to the first coil 78'. An end face 76' of the tang 310 can be abutted against a lip 312 that is formed on the plate member 300. The lip 312 forms the spring reaction member 54'. The axle 304 can include a washer-like head portion 330 and a stem 60' and can be unitarily formed of a length of cylindrical stock or tubing. The stem 60' can be staked to the plate member 300 to fixedly couple the arm 20' to the base 30.

Figure 21B:
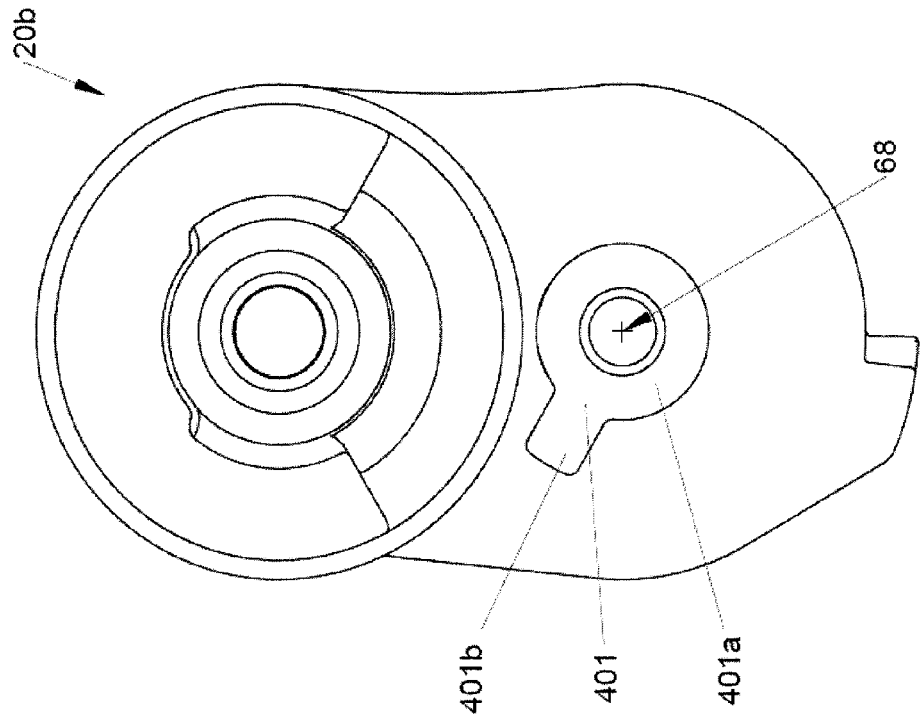
FIGS. 21A and 21B are plan views of the arms of two tensioner assemblies in a family of tensioner assemblies, the arms being configured with features that permit a common set of tooling and/or assembly steps to be employed in the assembly of the tensioner assemblies.
Figure 21A:
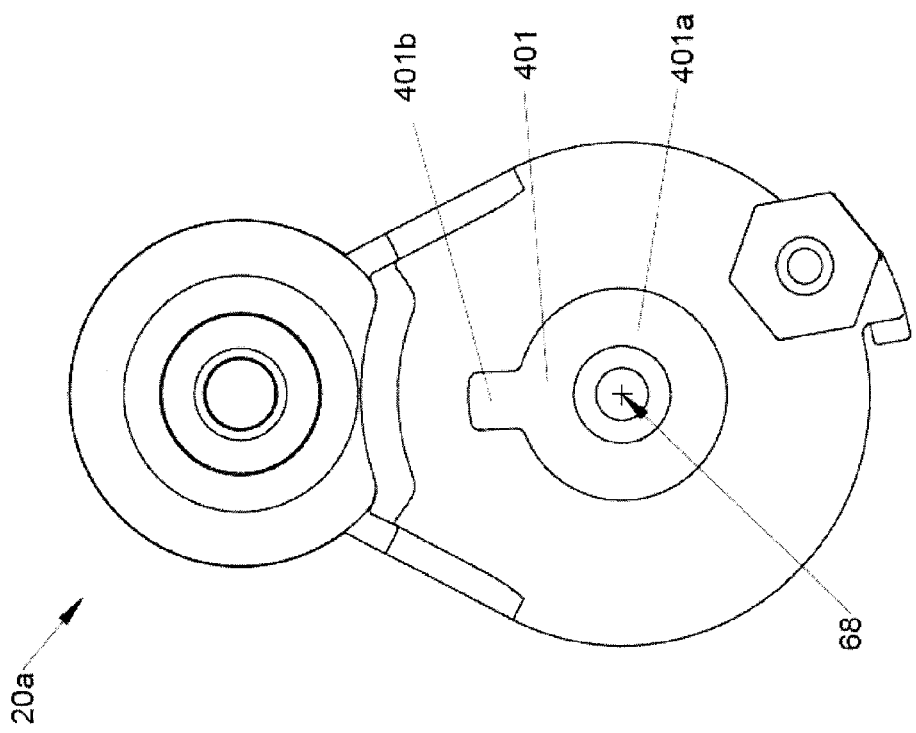

With reference to FIGS. 21A and 21B, a pair of arms 20a and 20b for a family of different tensioner assemblies is illustrated. The arms 20a, 20b can be configured to facilitate the efficient use of tooling and/or capital equipment to assemble the tensioner assemblies. For example, the arms 20a, 20b can include a feature that can be engaged by matingly shaped tooling (not shown) that can be employed to pivot the arms 20a, 20b about their respective axes 68 relative to the base (not shown) of the tensioner assembly. In the particular example provided, the feature comprises an aperture or recess which has a generally cylindrical portion 401a that is intersected by a keyway or slot 401b, but those of ordinary skill in the art will appreciate that the feature could be shaped differently or could comprise one or more male features, such as a male feature having a non-circular cross-sectional shape.

Figure 22B:
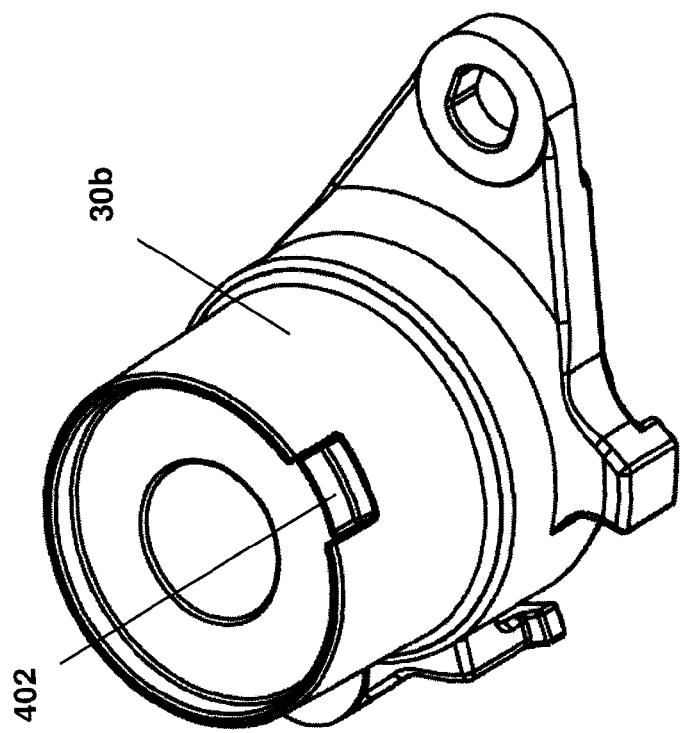
FIG. 22A and 22B are perspective view of the bases of two tensioner assemblies in a family of tensioner assemblies, the bases being configured with features that permit a common set of tooling and/or assembly steps to be employed in the assembly of the tensioner assemblies.
Figure 22A:
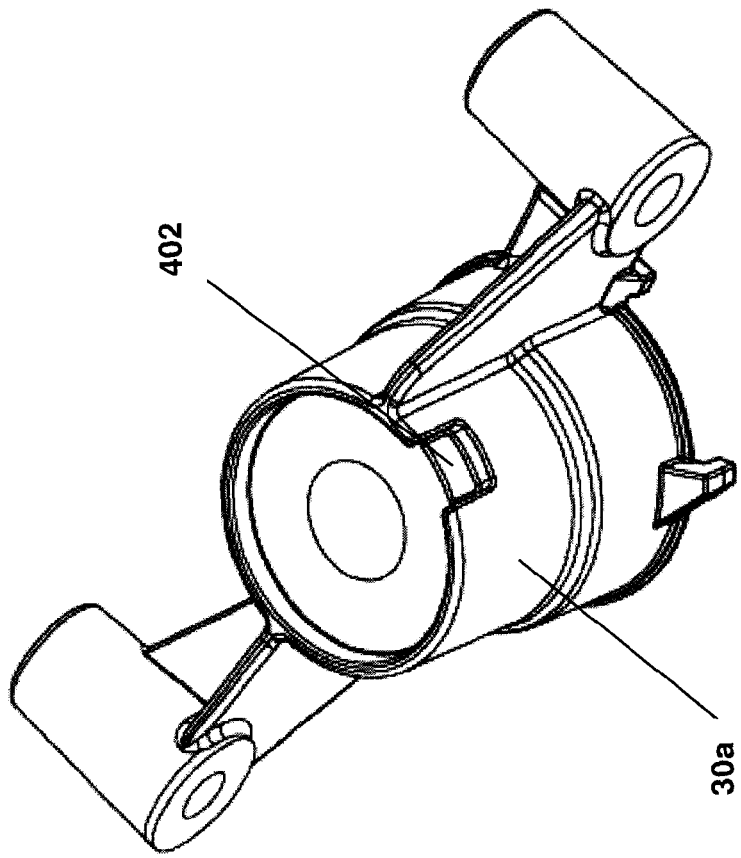

With reference to FIGS. 22A and 22B, it will be further appreciated that the family of different tensioners could employ features on other components to facilitate assembly via a common method and/or via common tooling elements. For example, a feature can comprise a slot or recess 402 that can be formed into the bases 30a and 30b of the different tensioner assemblies. The slot 402 can be engaged by tooling (not shown) to hold the base 30a, 30b in a stationary condition relative to the arm (not shown).

With reference to FIGS. 23A through 23C, a set of assembly features 500 can be incorporated into the tensioner assembly 10c to retain the base 30c to the arm 20c in an axial direction prior to the installation of the thrust washer 32 and the thrust plate 34. It will be appreciated from the above-disclosure that the spring 28 (FIG. 3) may need to be compressed axially between the base 30c and the arm 20c prior to certain assembly steps and that compression of the spring 28 (FIG. 3) would cause the spring 28 (FIG. 3) to exert a force onto the arm 20c that would urge the arm 20c away from the base 30c. For example, it may be desirable to compress the spring 28 (FIG. 3) such that the stem 60c extends through the base 30c by an amount that is sufficient to install the thrust washer 32 and the thrust plate 34. In the particular example provided, the set of assembly features 500 includes a first axial retaining feature 403, which can be formed on the arm 20c, and a second axial retaining feature 404 that can be formed on the base 30c. It will be appreciated that a force 405 can be employed to axially compress the spring 28 (FIG. 3) and a simultaneous moment can be employed to the arm 20c to axially compress the spring 28 (FIG. 3) while rotating the arm 20c (relative to the base 30c) to store torque in the spring 28 (FIG. 3) that biases the arm 20c in a predetermined rotational direction that would tend to tension an endless power transmitting element (e.g., belt). The features 403, 404 are configured such that they abut one another when the arm 20c is rotated relative to the base 30c in the predetermined rotational direction to thereby limit an amount by which the arm 20c may be rotated in the predetermined rotational direction. In this regard, a first rotational stop 410 on the arm 20c can abut a second rotational stop 412 on the base 30c. The features 403, 404 can also axially overlap one another such that the axial force exerted by the spring 28 (FIG. 3) in a direction opposite that of the arrow 405 is resisted by the features 403, 404 so that axial movement of the arm 20c relative to the base 30c is limited to a predetermined amount. In this regard, a first axial stop 414 on the arm 20c can abut a second axial stop 416 on the base 30c. In the particular example provided, the features 403, 404 comprise interlocking L-shaped lugs, but those of skill in the art will appreciate that the features may be differently shaped or configured and need not be associated with the rotational stops 410, 412 on the arm 20c and the base 30c.

Figure 24:
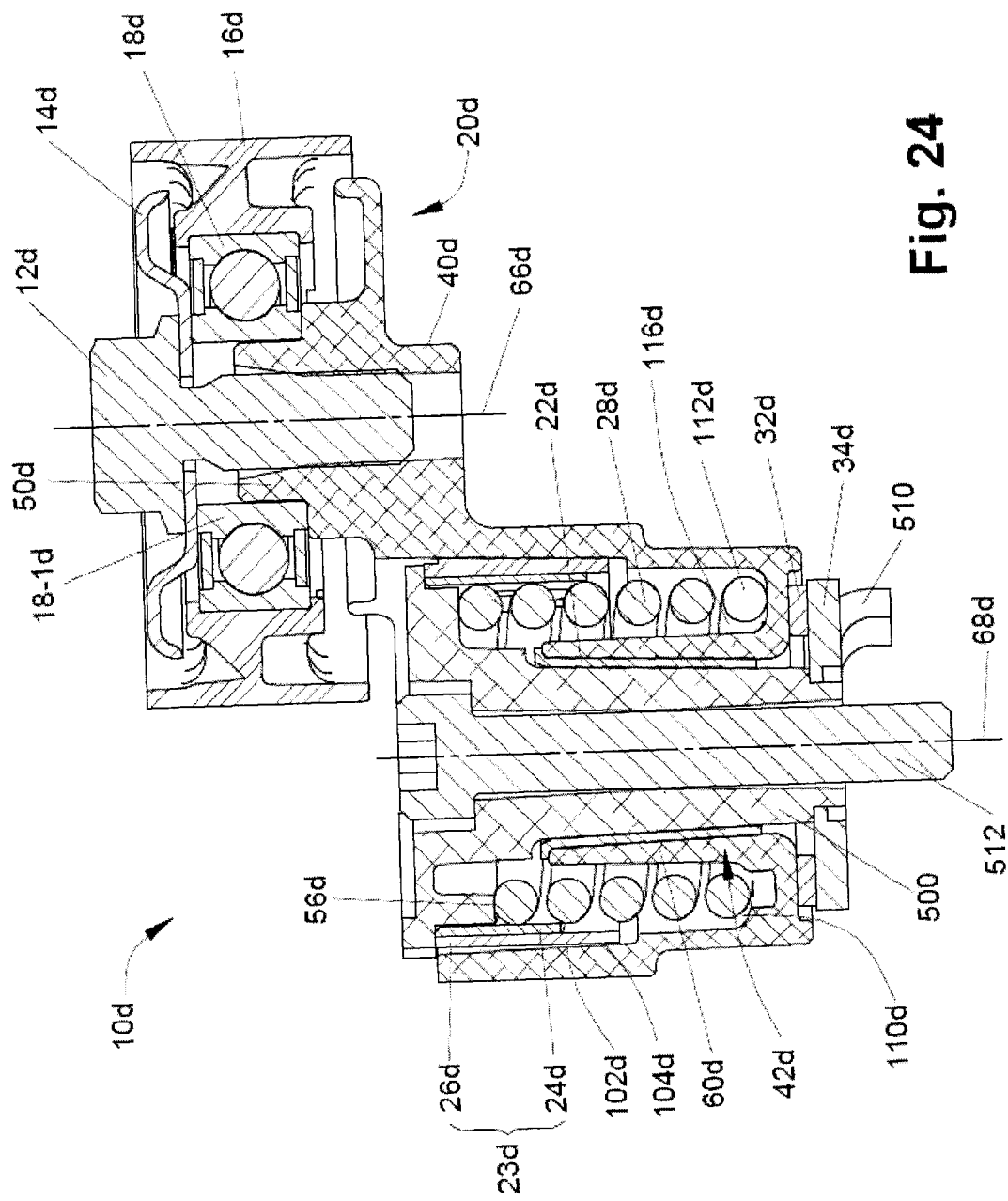
FIG. 24 is a sectional view of another tensioner assembly constructed in accordance with the teachings of the present disclosure.
Figure 25:
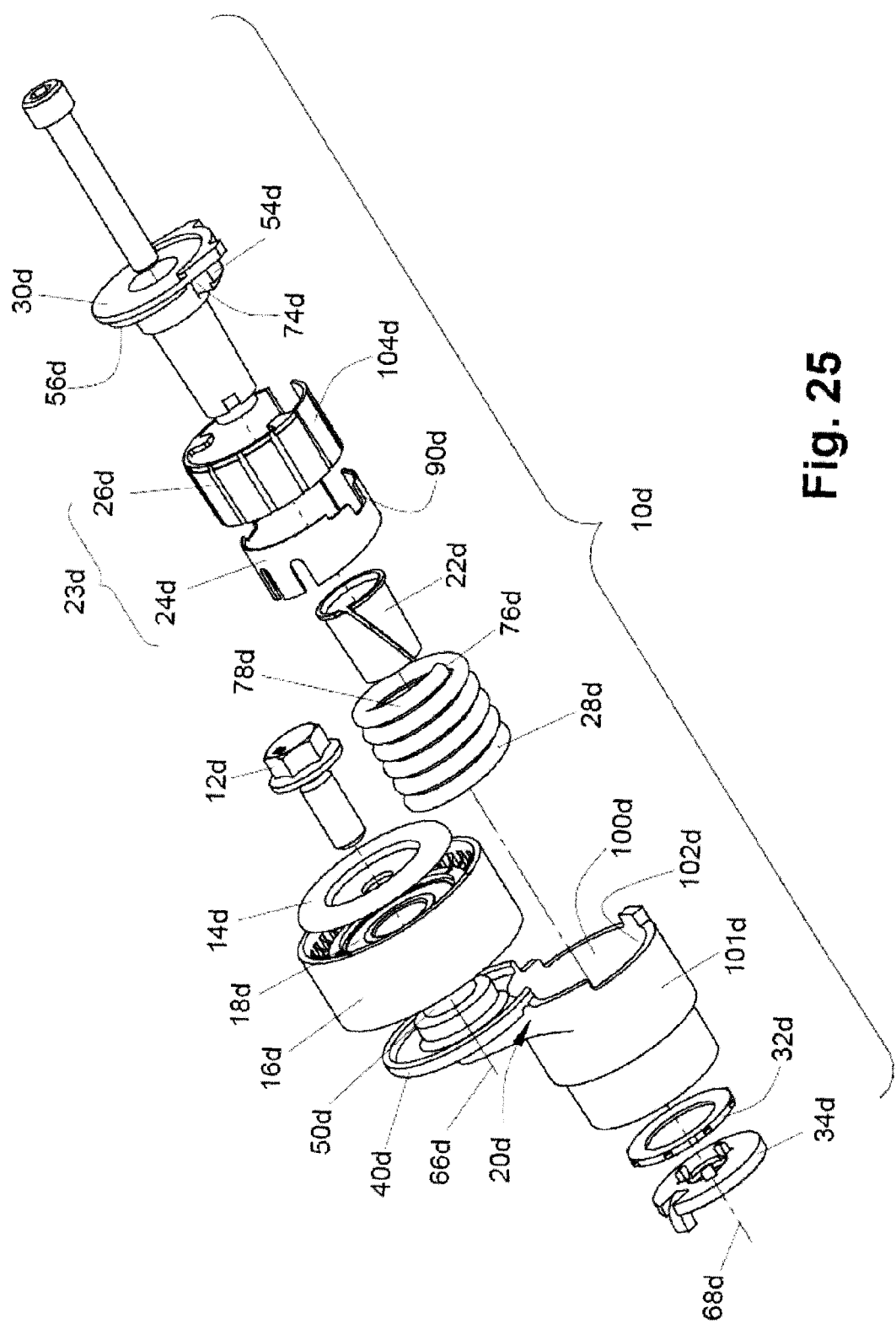
FIG. 25 is an exploded perspective view of the tensioner assembly of FIG. 24.

With reference to FIGS. 24 and 25, another tensioner assembly constructed in accordance with the teachings of the present disclosure is generally indicated by reference numeral 10d. The tensioner assembly 10d can be generally similar to the tensioner 10 (FIG. 1) except that the spring reaction member 54d and the brake drum 101d can be coupled to the base 30d and the arm member 40d, respectively, rather than vice versa as described above. The tensioner assembly 10d can include a fastener 12d, a dust shield 14d, a wheel 16d, a bearing 18d, an arm 20d, a pivot bushing 22d, a damping mechanism 23d (which can comprise a sleeve 24d and a damping element 26d), a spring 28d, a base 30d, a thrust washer 32d and a thrust plate 34d. The fastener 12d, the dust shield 14d, the bearing 18d and the thrust washer 32d can be generally conventional in their configuration and as such, need not be discussed in detail herein.

The arm 20d can include the arm member or portion 40d, a stem member or portion 42d and a brake drum 101d that can define a brake drum aperture 100d. The arm portion 40d can include a bearing mount 50d, while the stem portion 42d can include a stem 60d. The bearing mount 50d can be formed onto a first side of the arm portion 40d and can be configured to be received into an inner bearing race of the bearing 18d to support the wheel 16d for rotation about a first axis 66d. The fastener 12d can be threadably engaged to the bearing mount 50d and can cooperate with the dust shield 14d and the bearing 18d to rotatably mount the wheel 16d to the arm portion 40d. As noted above, the wheel 16d could be a roller, a sprocket or a pulley, for example.

The brake drum 101d can be configured to receive the spring 28d and the damping mechanism 23 and can be coupled to or integrally formed with the arm member 40d. The brake drum 101d can include a brake drum aperture 100d against which the damping element 26d can be frictionally engaged.

The base 30d can include the spring reaction member 54d, a spring support 56d and a post 500 that can be received between the pivot bushing 22d and the stem 60d such that the arm 20d and the brake drum 101d are rotatable about a second axis 68d that extends longitudinally through the post 500. The spring reaction member 54d can be offset from the second axis 68d and can be configured to engage the spring 28d to permit the spring 28d to apply a force to the base 30d that tends to rotate the arm portion 40 about the second axis 68d. In the particular example provided, the spring reaction member 54d is a block-like nub having an end face 74d that is configured to abut an end face 76d of a first helical coil 78d of the spring 28d. The spring support 56d can be helically shaped and can be configured to support the first helical coil 78d of the spring 28d.

The sleeve 24d can be formed of an appropriate material, such as steel, and can be configured to engage the spring 28d and distribute the force exerted by the spring 28d onto the damping element 26d. In the example provided, the sleeve 24d includes a window 90d into which the spring reaction member 54d can be received to thereby non-rotatably couple the sleeve 24d to the base 30d. Note that the sleeve 24d can be shaped to distribute load between the spring 28d and the damping element 26d in a desired manner.

The damping element 26d can be formed of a resilient material, such as an unfilled (non-reinforced) nylon so as to flexibly conform to the interior surface of a cylindrically-shaped brake drum aperture 100d in the brake drum 101d. The damping element 26d can be non-rotatably engaged to the sleeve 24d, as well as received into the brake drum aperture 100d. The damping element 26d can contact the circumferential surface 102d of the brake drum aperture 100d to dampen the torque that is transmitted about the second axis 68d. It will be appreciated from this disclosure that the surface 104d of the damping element 26d that contacts the circumferential surface 102d of the brake drum aperture 100d can be configured in a desired manner to control the distribution of force at given points along the surface 104d of the damping element 26d.

The spring 28d can be received into a spring pocket 110d formed in the arm 20d concentric with the stem 60d. An end 112d of the spring 28d opposite the spring reaction member 54d can engage the arm 20d in a desired manner. For example, the spring pocket 110d can be formed such that the axial end face end 112d of the last coil 116d of the spring 28d abuts a feature (e.g., a vertical wall) formed into the arm 20d. It will be appreciated that an end of the spring pocket 110d can be configured to support the last coil 116d in a desired manner at one or more locations along its (helical) length.

The thrust washer 32d can be received between the arm 20d and the thrust plate 34d, which can be fixedly coupled to the post 500 of the base 30d. It will be appreciated that the thrust washer 32d can control an amount of end play between the base 30d and the arm 20d, as well as to control friction between the arm 20d and the thrust plate 34d. The thrust plate 34d can include an engagement feature 510 that can be employed to orient the tensioner assembly 10d in a desired manner. An installation fastener 512 can be received through the post 500 and can be employed to fixedly couple the tensioner assembly 10d to another structure, such as an engine (not shown).

It will be appreciated that the spring reaction member 54d can be oriented about the base 30d to achieve the loading that is described in detail above (i.e., bushing and hub loads that counteract a spring reaction force that is applied to the spring reaction member; a spring load that can be directed tangent to the coils of the spring 28; and a grounding force that can be directed parallel to the spring load and perpendicular to the second axis 68d such that it intersects the second axis 68d.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein, even if not specifically shown or described, so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed is:

1. A tensioner assembly comprising:
    a base having a brake drum and a first bushing surface that defines a bushing aperture;
    an arm having a stem, an arm member, and a spring reaction member that are fixedly coupled together, the arm being pivotally coupled to the base about a first axis, the stem defining a second bushing surface that is received in the bushing aperture such that the second bushing surface is disposed radially within the first bushing surface;
    a helical coil spring disposed about the stem and a portion of the base that defines the bushing aperture, the helical coil spring having a plurality of coils that are disposed between a first end and a second end, the first end being engaged to the base, the second end being engaged to the spring reaction member, the helical coil spring biasing the arm member in a first rotational direction relative to the base, wherein rotation of the arm member in a second rotational direction opposite the first rotational direction applies a torque to the helical coil spring that causes at least a portion of the plurality of coils to expand in a radial direction;
    a pivot bushing received in the bushing aperture and engaging the first and second bushing surfaces;
    a wheel mounted to the arm member for rotation about a second axis that is parallel to and radially offset from the first axis; and
    a damping mechanism comprising a damping element that is frictionally engaged with the brake drum, the damping element being received between the helical coil spring and the brake drum, the damping element being arranged along the first axis between the pivot bushing and the wheel and being urged radially outwardly into contact with a surface of the brake drum by at least one of the plurality of coils, the damping mechanism being configured to damp motion of the arm about the first axis relative to the base;
    wherein the arm member is positionable relative to the base in a predetermined range of operating positions, wherein in each of the operating positions a hub load is applied to the arm member by the wheel when the tensioner assembly is tensioning a belt, wherein a pivot bushing load is transmitted between the pivot bushing and the stem when the tensioner assembly is tensioning a belt, wherein a spring reaction force is exerted by the spring reaction member on the second end of the helical coil spring and wherein in at least one of the operating positions the spring reaction member is positioned relative to the arm member such that the hub load and bushing load are directed generally opposite to the spring reaction force.

2. The tensioner assembly of claim 1, wherein contact between at least one of the plurality of coils and the damping mechanism occurs over an arc that is defined by a sector having an interior angle that is greater than or equal to 60 degrees when the arm member is disposed within a predetermined range of operating positions.

3. The tensioner assembly of claim 1, wherein the damping mechanism further comprises a sleeve that is received between the damping element and the helical coil spring.

4. The tensioner assembly of claim 3, wherein the damping element is non-rotatably coupled to the sleeve.

5. The tensioner assembly of claim 1, wherein the first and second bushing surfaces are frusto-conically shaped.

6. The tensioner assembly of claim 1, wherein the spring reaction force is disposed along the first axis between the hub load and the bushing load.

7. A tensioner assembly comprising:
 a base having a brake drum and a first bushing surface that defines a bushing aperture;
 an arm having a stem, an arm member, and a spring reaction member that are fixedly coupled together, the arm being pivotally coupled to the base about a first axis, the stem defining a second bushing surface that is received in the bushing aperture such that the second bushing surface is disposed radially within the first bushing surface;
 a helical coil spring disposed about the stem and a portion of the base that defines the bushing aperture, the helical coil spring having a plurality of coils that are disposed between a first end and a second end, the first end being engaged to the base, the second end being engaged to the spring reaction member, the helical coil spring biasing the arm member in a first rotational direction relative to the base, wherein rotation of the arm member in a second rotational direction opposite the first rotational direction applies a torque to the helical coil spring that causes at least a portion of the plurality of coils to expand in a radial direction;
 a pivot bushing received in the bushing aperture and engaging the first and second bushing surfaces;
 a wheel mounted to the arm member for rotation about a second axis that is parallel to and radially offset from the first axis; and
 a damping mechanism comprising a damping element that is frictionally engaged with the brake drum, the damping element being received between the helical coil spring and the brake drum, the damping element being arranged along the first axis between the pivot bushing and the wheel and being urged radially outwardly into contact with a surface of the brake drum by at least one of the plurality of coils, the damping mechanism being configured to damp motion of the arm about the first axis relative to the base;
 wherein the arm member is positionable relative to the base in a predetermined range of operating positions, wherein in each of the operating positions a hub load is applied to the arm member by the wheel when the tensioner assembly is tensioning a belt, wherein a pivot bushing load is transmitted between the pivot bushing and the stem when the tensioner assembly is tensioning a belt, wherein a spring reaction force is exerted by the spring reaction member on the second end of the helical coil spring and wherein the spring reaction member is positioned relative to the arm member such that the hub load and the spring reaction force are partially canceled directly on the arm member in each of the operating positions.

8. The tensioner assembly of claim 7, wherein contact between at least one of the plurality of coils and the damping mechanism occurs over an arc that is defined by a sector having an interior angle that is greater than or equal to 60 degrees when the arm member is disposed within a predetermined range of operating positions.

9. The tensioner assembly of claim 7, wherein the damping mechanism further comprises a sleeve that is received between the damping element and the helical coil spring.

10. The tensioner assembly of claim 9, wherein the damping element is non-rotatably coupled to the sleeve.

11. The tensioner assembly of claim 7, wherein the first and second bushing surfaces are frusto-conically shaped.

12. The tensioner assembly of claim 7, wherein the spring reaction force is disposed along the first axis between the hub load and the bushing load.

13. A tensioner assembly comprising:
 a base having a brake drum and a first bushing surface that defines a bushing aperture;
 an arm having a stem, an arm member, and a spring reaction member that are fixedly coupled together, the arm being pivotally coupled to the base about a first axis, the stem defining a second bushing surface that is received in the bushing aperture such that the second bushing surface is disposed radially within the first bushing surface;
 a wheel mounted to the arm member for rotation about a second axis that is parallel to and radially offset from the first axis;
 a helical coil spring disposed about the stem, the helical coil spring having a plurality of coils that are disposed between a first end and a second end, the first end being engaged to the base, the second end being engaged to the spring reaction member, the helical coil spring biasing the arm member in a first rotational direction relative to the base, wherein rotation of the arm member in a second rotational direction opposite the first rotational direction applies a torque to the helical coil spring that causes at least a portion of the plurality of coils to expand in a radial direction;
 a pivot bushing received in the bushing aperture and engaging the first and second bushing surfaces;
 a damping mechanism comprising a damping element that is frictionally engaged with the brake drum, the damping element being received between the helical coil spring and the brake drum, the damping element being arranged along the first axis between the pivot bushing and the wheel and being urged radially outwardly into contact with a surface of the brake drum by at least one of the plurality of coils, the damping mechanism being configured to damp motion of the arm about the first axis relative to the base;
 wherein the arm member is positionable relative to the base in a predetermined range of operating positions, and wherein in each of the operating positions:
  a hub load is applied to the arm member by the wheel when the tensioner assembly is tensioning a belt,
  a pivot bushing load is transmitted between the pivot bushing and the stem when the tensioner is tensioning a belt,
  a spring reaction force is exerted by the spring reaction member against the second end of the helical coil spring, and
  the spring reaction member is positioned about the first axis such that the hub load is directed to at least partly cancel out the spring reaction force.

14. The tensioner assembly of claim 13, wherein contact between at least one of the plurality of coils and the damping mechanism occurs over an arc that is defined by a sector having an interior angle that is greater than or equal to 60 degrees when the arm member is disposed within a predetermined range of operating positions.

15. The tensioner assembly of claim 13, wherein the damping mechanism further comprises a sleeve that is received between the damping element and the helical coil spring.

16. The tensioner assembly of claim 15, wherein the damping element is non-rotatably coupled to the sleeve.

17. The tensioner assembly of claim 13, wherein the first and second bushing surfaces are frusto-conically shaped.

18. The tensioner assembly of claim 13, wherein the spring reaction force is disposed along the first axis between the hub load and the bushing load.

19. A tensioner assembly comprising:
a base defining a first bushing surface;
an arm having an arm member, a stem and a brake drum that are fixedly coupled to one another, the stem having a second bushing surface that defines a bushing aperture, the first bushing surface being received in the bushing aperture such that the second bushing surface is disposed radially outward of the first bushing surface, the brake drum being disposed about the stem, the arm being coupled to the base for pivoting motion relative to the base about a first axis;
a spring reaction member coupled to the base;
a helical coil spring disposed within the arm about the stem, the helical coil spring having a plurality of coils that are disposed between a first end and a second end, the first end being engaged to the arm, the second end being engaged to the spring reaction member, the helical coil spring biasing the arm member in a first rotational direction relative to the base, wherein rotation of the arm member in a second rotational direction opposite the first rotational direction applies a torque to the helical coil spring that causes at least a portion of the plurality of coils to expand in a radial direction;
a pivot bushing received in the bushing aperture and engaged to the first and second bushing surfaces;
a wheel mounted to the arm member for rotation about a second axis that is parallel to and radially offset from the first axis; and
a damping mechanism comprising a damping element that is non-rotatably coupled to the base and frictionally engaged with the brake drum, the damping element being received between the helical coil spring and the brake drum, the damping element being arranged along the first axis between the pivot bushing and the wheel and being urged radially outwardly into contact with a surface of the brake drum by at least one of the plurality of coils, the damping mechanism being configured to damp motion of the arm about the first axis relative to the base;
wherein the arm member is positionable relative to the base in a predetermined range of operating positions, wherein in each of the operating positions a hub load is applied to the arm member by the wheel when the tensioner assembly is tensioning a belt, wherein a pivot bushing load is transmitted between the pivot bushing and the stem when the tensioner assembly is tensioning a belt, wherein a spring reaction force is exerted by the spring reaction member on the second end of the helical coil spring and wherein the spring reaction member is positioned relative to the arm member such that the hub load and the spring reaction force are partially canceled directly on the arm member in each of the operating positions.

20. The tensioner assembly of claim 19, wherein contact between at least one of the plurality of coils and the damping mechanism occurs over an arc that is defined by a sector having an interior angle that is greater than or equal to 60 degrees when the arm member is disposed within a predetermined range of operating positions.

21. The tensioner assembly of claim 19, wherein the damping mechanism further comprises a sleeve that is received between the damping element and the helical coil spring.

22. The tensioner assembly of claim 21, wherein the damping element is non-rotatably coupled to the sleeve.

23. The tensioner assembly of claim 19, wherein the first and second bushing surfaces are frusto-conically shaped.

24. The tensioner assembly of claim 19, wherein the spring reaction force is disposed along the first axis between the hub load and the bushing load.

25. A tensioner assembly comprising:
a base defining a first bushing surface;
an arm having an arm member, a stem and a brake drum that are fixedly coupled to one another, the stem having a second bushing surface that defines a bushing aperture, the first bushing surface being received in the bushing aperture such that the second bushing surface is disposed radially outward of the first bushing surface, the brake drum being disposed about the stem, the arm being coupled to the base for pivoting motion relative to the base about a first axis;
a spring reaction member coupled to the base;
a helical coil spring disposed within the arm about the stem, the helical coil spring having a plurality of coils that are disposed between a first end and a second end, the first end being engaged to the arm, the second end being engaged to the spring reaction member, the helical coil spring biasing the arm member in a first rotational direction relative to the base, wherein rotation of the arm member in a second rotational direction opposite the first rotational direction applies a torque to the helical coil spring that causes at least a portion of the plurality of coils to expand in a radial direction;
a pivot bushing received in the bushing aperture and engaged to the first and second bushing surfaces;
a wheel mounted to the arm member for rotation about a second axis that is parallel to and radially offset from the first axis; and
a damping mechanism comprising a damping element that is non-rotatably coupled to the base and frictionally engaged with the brake drum, the damping element being received between the helical coil spring and the brake drum, the damping element being arranged along the first axis between the pivot bushing and the wheel and being urged radially outwardly into contact with a surface of the brake drum by at least one of the plurality of coils, the damping mechanism being configured to damp motion of the arm about the first axis relative to the base;
wherein the arm member is positionable relative to the base in a predetermined range of operating positions, wherein in each of the operating positions a hub load is applied to the arm member by the wheel when the tensioner assembly is tensioning a belt, wherein a pivot bushing load is transmitted between the pivot bushing and the stem when the tensioner assembly is tensioning a belt, wherein a spring reaction force is exerted by the spring reaction member on the second end of the helical coil spring and wherein in at least one of the operating positions the spring reaction member is positioned relative to the arm member such that the hub load and bushing load are directed generally opposite to the spring reaction force.

26. The tensioner assembly of claim 25, wherein contact between at least one of the plurality of coils and the damping mechanism occurs over an arc that is defined by a sector having an interior angle that is greater than or equal to 60 degrees when the arm member is disposed within a predetermined range of operating positions.

27. The tensioner assembly of claim 25, wherein the damping mechanism further comprises a sleeve that is received between the damping element and the helical coil spring.

28. The tensioner assembly of claim 27, wherein the damping element is non-rotatably coupled to the sleeve.

29. The tensioner assembly of claim 25, wherein the first and second bushing surfaces are frusto-conically shaped.

30. The tensioner assembly of claim 25, wherein the spring reaction force is disposed along the first axis between the hub load and the bushing load.

31. A tensioner assembly comprising:
a base having a first bushing surface;
an arm having a stem, an arm member and a brake drum that are fixedly coupled to one another, the stem being pivotally coupled to the base about a first axis, the base being received in the stem, the stem having a second bushing surface that defines a bushing aperture into which the first bushing surface is received;
a spring reaction member coupled to the base;
a wheel mounted to the arm member for rotation about a second axis that is parallel to and radially offset from the first axis;
a helical coil spring disposed about the stem, the helical coil spring having a plurality of coils that are disposed between a first end and a second end, the first end being engaged to the arm, the second end being engaged to the spring reaction member, the helical coil spring biasing the arm member in a first rotational direction relative to the base, wherein rotation of the arm member in a second rotational direction opposite the first rotational direction applies a torque to the helical coil spring that causes at least a portion of the plurality of coils to expand in a radial direction;
a pivot bushing received in the bushing aperture and engaging the first and second bushing surfaces; and
a damping mechanism comprising a damping element that is non-rotatably coupled to the base and frictionally engaged with the brake drum, the damping element being received between the helical coil spring and the brake drum, the damping element being arranged along the first axis between the pivot bushing and the wheel and being urged radially outwardly into contact with a surface of the brake drum by at least one of the plurality of coils, the damping mechanism being configured to damp motion of the arm about the first axis relative to the base;
wherein the arm member is positionable relative to the base in a predetermined range of operating positions, and wherein in each of the operating positions:
a hub load is applied to the arm member by the wheel when the tensioner assembly is tensioning a belt,
a pivot bushing load is transmitted between the pivot bushing and the stem when the tensioner is tensioning a belt,
a spring reaction force is exerted by the spring reaction member against the second end of the helical coil spring, and
the spring reaction member is positioned about the first axis such that the hub load is directed to at least partly cancel out the spring reaction force.

32. The tensioner assembly of claim 31, wherein contact between at least one of the plurality of coils and the damping mechanism occurs over an arc that is defined by a sector having an interior angle that is greater than or equal to 60 degrees when the arm member is disposed within a predetermined range of operating positions.

33. The tensioner assembly of claim 31, wherein the damping mechanism further comprises a sleeve that is received between the damping element and the helical coil spring.

34. The tensioner assembly of claim 33, wherein the damping element is non-rotatably coupled to the sleeve.

35. The tensioner assembly of claim 31, wherein the first and second bushing surfaces are frusto-conically shaped.

36. The tensioner assembly of claim 31, wherein the spring reaction force is disposed along the first axis between the hub load and the bushing load.

* * * * *